US010685652B1

(12) United States Patent
Cherukuri et al.

(10) Patent No.: US 10,685,652 B1
(45) Date of Patent: Jun. 16, 2020

(54) DETERMINING DEVICE GROUPS

(71) Applicant: Amazon Technologies, Inc., Seattle, WA (US)

(72) Inventors: Venkata Snehith Cherukuri, San Jose, CA (US); Joseph White, San Francisco, CA (US); Vinodth Kumar Mohanam, Santa Clara, CA (US); Rami Habal, San Francisco, CA (US); Menghan Li, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/928,682

(22) Filed: Mar. 22, 2018

(51) Int. Cl.
G06F 15/00 (2006.01)
G10L 15/00 (2013.01)
G10L 17/00 (2013.01)
G10L 15/22 (2006.01)
G10L 25/84 (2013.01)
G10L 15/28 (2013.01)

(52) U.S. Cl.
CPC ............. G10L 15/22 (2013.01); G10L 15/28 (2013.01); G10L 17/005 (2013.01); G10L 25/84 (2013.01); *G10L 2015/223* (2013.01)

(58) Field of Classification Search
CPC ....... G10L 15/22; G10L 15/28; G10L 17/005; G10L 25/84; G10L 2015/223
USPC .......................... 704/200, 211, 216, 231, 233
See application file for complete search history.

(56) References Cited

U.S. PATENT DOCUMENTS

| 9,653,075 | B1* | 5/2017 | Chen | H04L 12/4625 |
| 9,721,572 | B2* | 8/2017 | Yokoya | H04N 21/233 |
| 10,149,056 | B1* | 12/2018 | Zhang | H04W 24/02 |
| 10,192,553 | B1* | 1/2019 | Chenier | G10L 15/22 |
| 2004/0039968 | A1* | 2/2004 | Hatonen | G06K 9/6284 |
| | | | | 714/39 |
| 2016/0005404 | A1* | 1/2016 | Yokoya | H04N 21/233 |
| | | | | 704/275 |
| 2016/0366565 | A1* | 12/2016 | Fjelberg | H04W 4/08 |
| 2017/0090864 | A1* | 3/2017 | Jorgovanovic | G06F 3/167 |

(Continued)

OTHER PUBLICATIONS

Tibshirani, et al., "Estimating the number of clusters in a data set via the gap statistic", Final revision Nov. 2000, Royal Statistical Society 2001, retrieved on Mar. 17, 2018, 13 pages.

*Primary Examiner* — Khai N. Nguyen
(74) *Attorney, Agent, or Firm* — Lee & Hayes, P.C.

(57) ABSTRACT

This disclosure describes, in part, techniques for determining device groupings, or clusters, for multiple voice-enabled devices. The device clusters may be determined based on metadata data for audio signals (or audio data) generated by each of the multiple voice-enabled devices. For example, a remote system may analyze timestamp data for the audio signals received from the devices, and determine that the devices detected the same voice command of a user based on the timestamp data indicating that the audio signals were received within a threshold period of time from each other. Additionally, the remote system may analyze other metadata of the audio data, such as signal-to-noise (SNR) values, and determine that the SNR values are within a threshold value. The remote system may determine device clusters for the voice-enabled devices of a user based on these, and potentially other, types of metadata of the audio signals.

20 Claims, 11 Drawing Sheets

(56) References Cited

U.S. PATENT DOCUMENTS

| | | | |
|---|---|---|---|
| 2017/0133011 A1* | 5/2017 | Chen | H04L 12/4625 |
| 2017/0249940 A1* | 8/2017 | Chen | H04L 12/4625 |
| 2018/0047390 A1* | 2/2018 | Yoo | G06F 3/167 |
| 2018/0227669 A1* | 8/2018 | Morton | H04R 1/406 |
| 2018/0338035 A1* | 11/2018 | Johnson | H04L 65/1069 |
| 2019/0019504 A1* | 1/2019 | Hatambeiki | G10L 15/20 |
| 2019/0057705 A1* | 2/2019 | Kar | G10L 19/02 |

\* cited by examiner

DETERMINING DEVICE GROUPS

BACKGROUND

As the capabilities of computing devices continue to evolve, many different ways have been introduced to allow users to interact with computing devices, such as through mechanical devices (e.g., keyboards, mice, etc.), touch screens, motion, and gesture. Many computing devices are now capable of receiving and responding to voice commands, including desktops, tablets, entertainment systems, and portable communication devices. Due to their usefulness, it is still early to know, but it might be the beginning of an emerging trend for users to place multiple voice-enabled devices throughout their homes to receive and respond to their voice commands in different locations in their homes. Having multiple voice-enabled devices placed throughout an environment increases the complexity of determining how to respond to a voice command. Provided herein are specific technical solutions for improving existing systems so they are more useful for users having multiple voice controlled devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
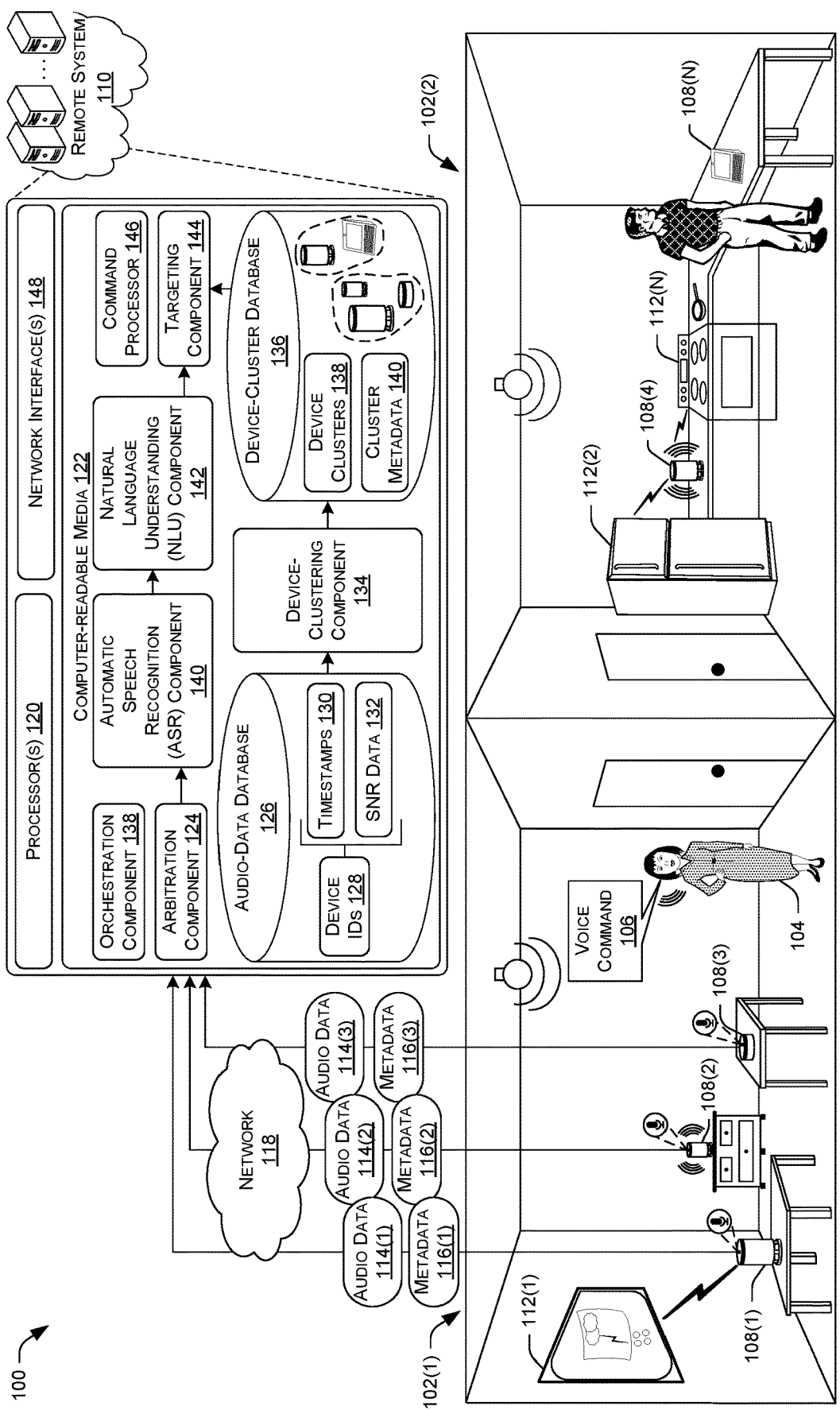
FIG. 1 illustrates a schematic diagram of an illustrative environment in which a user issues a speech utterance, multiple voice-enabled devices detect the speech utterance, and a remote system determines device clusters for the voice-enabled devices.

With the proliferation of sound-controlled computing devices, sometimes referred to herein as "voice-enabled devices," users are able to interact with more of their computing devices through speech. For instance, a user may utter a command or make other types of sound(s), which is sometimes referred to herein as "voice commands," via speech or other types of sounds to a voice-enabled device. In response, the device by itself and/or with other computing systems (e.g., remote computing systems) performs at least one operation, such as turning on/off an appliance, receiving music data, performing a telephone call, etc. Due to the usefulness of these voice-enabled devices, users often have multiple devices in an environment, such as their home. While multiple voice-enabled devices may increase user convenience and satisfaction throughout their home, in situations in which multiple voice-enabled devices are near each other (such as within a single room, in adjoining rooms, or otherwise close enough to capture the same voice command), it may be more difficult to determine which of the voice-enabled devices is best to continue capturing audio representing the voice command and/or respond to the command in the speech utterance.

For instance, if multiple voice-enabled devices detect a wake word or other indicator of the start of a voice command from a user, it may be more difficult to determine which of the voice-enabled devices should "listen" to the remaining portion of the voice command, and/or determine which of the voice-enabled devices is to respond to the command. As another example, multiple voice-enabled devices may be positioned in a noisy environment such that one of the voice-enabled devices is sometimes unable to detect the voice command directed to it, despite another device being able to detect it. For example, an Echo (e.g., a type of screen-less far-field, voice-controlled device) may be in the same room as an Echo Show (e.g., a type of far field voice-controlled device with a screen). When the Echo Show is playing a movie or otherwise outputting audio, it may be easier for the Echo to detect and capture a voice command intended for the Echo Show. These types of scenarios, as well as other types of scenarios, are examples of how having multiple voice-enabled devices in the same environment increases the complexity of determining how to listen to and respond to a voice command from a user.

Described herein, at least in part, are technological techniques for using various types of contextual information, including that associated with multiple voice-enabled devices, to determine how to "cluster" or otherwise group the voice-enabled devices. In some examples, creating device clusters for multiple voice-enabled devices may help determine which voice-enabled device is to respond to a voice command of a user. In some examples, the contextual information utilized to determine device clusters may include timestamp information indicating times at which the voice-enabled devices detect voice commands of a user, signal-to-noise (SNR) values for audio data generated by the voice-enabled devices that represents the voice commands, and so forth. The contextual information for the multiple voice-enabled devices may be analyzed and, based on the analysis, device clusters may be created, determined, etc. By grouping voice-enabled devices into device clusters according to the techniques described herein, more appropriate voice-enabled devices may be selected to respond to a user's voice command, thereby improving user experience.

To provide an illustration of a specific instance where device clusters may be utilized to determine an appropriate voice-enabled device to respond to a user's command, envision a scenario where a first voice-enabled device and a second voice-enabled device are located in a same room of a house, and a third voice-enabled device is located upstairs and in a different room of the house. In this example, the second voice-enabled device and the third voice-enabled device may both be playing music. If a user in the room with the first and second voice-enabled devices issues a voice command of "Please turn down the volume," the first voice-enabled device may detect the voice command, but the second and third voice-enabled devices may not detect the voice command over the noise from the music. After the audio data generated by the first voice-enabled device is processed using speech-processing techniques (locally, remotely, both, or otherwise), it may be determined that the first voice-enabled device is unable to appropriately respond to the voice command because it is not playing music or a movie for which volume may be turned down. Further, because the second and third voice-enabled devices are both playing music, either one of or both the devices may be able to perform the operation, introducing a level of complexity to select which device(s) is/are to respond to the voice command. Using the techniques described herein, a device cluster may have already been generated and data stored indicating an association with the first voice-enabled device and the second voice-enabled device. If a device cluster has been generated for the first and second voice-enabled devices, then the second voice-enabled device may be selected to respond to the voice command as it is likely the user intends to control the volume of the music being played in the room in which the user issued the voice command. According to the device cluster techniques described herein, device clusters may be determined and generated for voice-enabled devices which increase user experiences in various situations, such as the scenario illustrated above. Generally, a device cluster may be a type of device group that includes voice-enabled devices that have similar properties. For instance, a device cluster may be a stored association, group, etc., between voice-enabled devices that are located in the same room(s) defined by walls, in proximity to each other as defined by sensitivity of microphone(s) and audio processing included in each device, etc.

Voice-enabled devices generally include various sensors and components to receive and respond to voice commands from users. For example, voice-enabled devices may include one or more microphones to generate audio data that represents voice commands of users. Additionally, the voice-enabled devices may include various components to process the audio data, such as speech-processing components. The voice-enabled devices may be configured to analyze audio data representing voice commands of the users, and perform, in some examples along with one or more other computing devices, various operations that are responsive to the voice commands, such as playing music, playing a movie, setting alarms, and so forth.

In some examples, the voice-enabled devices have relatively low functionality with respect to processing of the audio data. For example, the voice-enabled devices may include pre-processing components to perform less complicated processing on audio data, such as beamforming components, echo-cancellation components, wake-word detection components, and so forth. In such examples, the voice-enabled devices may serve as an interface or "middle man" between a remote system, and a user. In this way, the more intensive processing involved in speech processing may be performed using resources of remote systems, which may increase the performance of the speech-processing techniques utilized on audio data generated by the voice-enabled devices. For example, while the voice-enabled devices may be configured with components for determining metadata associated with the audio data (e.g., SNR values, timestamp data, etc.), in some examples the voice-enabled devices may relay the audio data to a speech-processing system which performs processing techniques on the audio data to determine how to respond to voice commands of the users.

Thus, in some examples, some or all of the techniques described herein may be performed by a speech processing and/or other type of remote system (e.g., "cloud-based system," "software as a service (SaaS) system," "network accessible system," etc.), which receives data from the voice-enabled devices and is located remotely from the voice-enabled devices. Each of the voice-enabled devices may access the speech-processing system through a communications network, such as the internet, to provide the speech-processing system with the captured audio data and the various types of contextual information detected, determined, etc., by the voice-enabled devices. In various examples, the voice-enabled devices may receive a "wake" trigger (e.g., wake word, button input, etc.) which indicates to the voice-enabled devices that a user is speaking a command, and the voice-enabled devices begin sending audio data representing the spoken command to the network-based speech service.

Accordingly, multiple voice-enabled devices may detect the same voice command (e.g., detect the same wake word) from a user, and subsequently begin sending separate audio data representing the voice command of the user. However, because the multiple audio data both represent the same voice command, the speech-processing system may only need to analyze audio data from one of the voice-enabled devices. Generally, the more "clean" the audio data is that represents the voice command, the more accurately the speech-processing system is able to process the audio data to determine how to respond to the audio data. For instance, audio data with higher SNR values may result in better transcription into text by the speech-processing systems because the energy levels of the voice command are higher relative to energy levels of the noise, making the voice command easier to identify and analyze from amongst the noise in the audio data. Thus, the speech-processing system may include an arbitration component to determine which audio data to continue to receive and subsequently process from the multiple voice-enabled devices based on various contextual information, such as SNR values. The voice-enabled device whose audio data is selected for processing may be selected as the "source device," and continues to send the audio data representing the voice command until an end of the voice command of the user is detected (e.g., by the remote system). The voice-enabled device(s) whose audio data was not selected may be instructed to stop sending the audio data, or be "killed off" in arbitration by the arbitration component. The audio data received from the source device may then be processed by the speech-processing system to determine how to respond to the voice command.

In such examples, the audio data received from each of the voice-enabled devices, and the associated metadata, may be utilized by the speech-processing system to determine and create device clusters for the multiple voice-enabled devices. For example, the speech-processing system may receive, identify, or otherwise determine, timestamp data for the audio data received from each of the voice-enabled devices. The timestamp data may indicate times at which the speech-processing system received the audio data from each of the voice-enabled devices. In some examples, the speech-processing system may employ a "more aggressive" approach to determining device clusters where the speech-processing system analyzes timestamp data for multiple voice-enabled devices, determines that the audio data received from each of the multiple voice-enabled devices were received within a threshold period of time (e.g., 1 second, 3 seconds, 10 seconds, etc.), and create and store a device cluster including the multiple voice-enabled devices. Stated otherwise, the speech-processing system may determine that, because each of the voice-enabled devices sent audio data in a relatively short window of time, the voice-enabled devices detected the same voice command from a user, and are thus in a same environment. In some examples, an environment in which voice-enabled devices are located may comprise a room defined by walls of a building, multiple rooms defined by walls of a building, etc. Voice-enabled devices may be considered to be placed in the same environment if the voice-enabled devices hear the same utterance of a user. For instance, voice-enabled devices may be considered in the same environment if they are placed in the same room, or in multiple rooms that are connected, such as the voice-enabled devices are able to hear the same utterance of the user.

In some examples, the more aggressive form of determining a device cluster may analyze a single instance where timestamps for audio data received from multiple voice-enabled devices were received within the same window of time. However, in some examples the speech-processing system may store timestamp data for each of the voice-enabled devices each instance the speech-processing system received audio data from at least one of the voice-enabled devices. The speech-processing system may then analyze, the timestamp data for a large group of the instances (e.g., 50 instances, 100 instances, 300 instances, etc.) where the speech-processing system received audio data from the voice-enabled devices. In such examples, the speech-processing system may determine, based on the timestamps for the larger group of instances, how often timestamps for the multiple voice-enabled devices indicate that audio data was received from the multiple devices within the defined window of time, e.g., a threshold period of time. The speech-processing system may create a device cluster for the various devices using different metrics when analyzing the timestamp data for the large group of instances. For example, the speech-processing system may create a device cluster for multiple voice-enabled devices if the timestamp data indicates that the multiple voice-enabled devices each transmitted audio data within the threshold period of time more than some predefined period of times (e.g., after 50 times, after 100 times, etc.). As another example, the speech-processing system may create a device cluster for multiple voice-enabled devices if the timestamp data indicates that, for the group of instances, the multiple voice-enabled devices each transmitted audio data within the window time more than a threshold percentage of the instances in the group of instances (e.g., more than 50% of the instances, more than 75% of the instances, etc.).

In some examples, the speech-processing system may utilize other types of metadata to determine and create device clusters for multiple voice-enabled devices. For example, the speech-processing system may further utilize audio-data metric values to determine device clusters, such as signal-to-noise (SNR) values for the audio data. Generally, SNR values for the audio data may represents the energy level of the voice command of the user in the audio data versus the energy level of noise included in the audio data. In such examples, the speech-processing system may utilize a "less aggressive" approach to determining a device cluster where, not only must voice-enabled devices detect the same voice commands to be included in the device cluster, but the respective SNR values for the different audio data must also be within some threshold amount from each other to create a device cluster.

As noted above, although the audio data being received from voice-enabled devices may be killed off in arbitration by an arbitration component of the voice-enabled devices, the metadata for the respective audio data may still be obtained and stored. For instance, the speech-processing system may receive, determine, or otherwise identify SNR values for the audio data received from each voice-enabled device. The speech-processing system may receive audio data from multiple voice-enabled devices within the window of time, and analyze the SNR values for the different audio data. Before creating a device-cluster for the multiple voice-enabled devices, the speech-processing system may determine whether the SNR values are within a threshold value (e.g., 50% similar, 70% similar, 90% similar, etc.). In this way, the speech-processing system may determine that, not only are the multiple voice-enabled devices able to detect the same voice commands from a user, but the multiple voice-enabled devices are also close enough in proximity to warrant creation of a device cluster for the multiple voice-enabled devices. For example, a house may have a large room where the kitchen is connected to a living room such that a voice-enabled device in the kitchen detects the same voice commands as a voice-enabled device located across the room in the living room. In such an example, the SNR values for audio data transmitted by the two voice-enabled devices may not be within the threshold value, and the speech-processing system may refrain from creating a device cluster for the devices. In some examples, this "less aggressive" approach to creating device clusters may be advantageous. For example, a user in the living room may issue a voice command of "Please turn off," intending that the voice-enabled device in the living room turn off a television in the living room. If the more aggressive approach to determining a device cluster had been enabled, the voice-enabled device in the kitchen may have been selected to respond to the voice command, and may have turned off an oven in the kitchen. However, depending on the user, the environment, and other factors, any one of the techniques for determining a device cluster described herein may be utilized.

Often, users of the speech-processing service have placed many voice-enabled devices all throughout their homes to listen to and respond to voice commands in different rooms of their houses. In such examples, the techniques described herein may include the creation of multiple device clusters for a single user account and/or profile. For example, the speech-processing system may include one or more components which determine how to cluster the voice-enabled devices into multiple device clusters using the types of metadata described thus far (e.g., timestamp data, SNR values, etc.). The components may execute one or more algorithms to determine device clusters based on a mathematical/statistical analysis of metadata for a group of instances where at least one of multiple voice-enabled devices transmitted audio data to the speech-processing system. For instance, the components may associate each of the voice-enabled devices with respective timestamp data and SNR values for each instance where audio data was received by the speech-processing system. The components may then execute, for example, a k-means clustering algorithm to partition the multiple voice-enabled devices into two or more device clusters based on their associated metadata using techniques similar to those described above. Further, the components may dynamically determine, estimate, etc., a number of device clusters to be used for multiple voice-enabled devices of a user. For instance, the components may utilize gap statistic estimation to determine how the number of device clusters to create for voice-enabled devices of a user, and provide the number of device clusters as an input into the k-means clustering algorithm.

Accordingly, the components of the speech-processing system may automate techniques for determining how many device clusters to create for a user, customer, etc., and further determine which voice-enabled devices belong to which device cluster. In this way, a speech-processing system may determine, generate, and store device clusters for multiple voice-enabled devices of a user. The device clusters may then be utilized to help determine an appropriate voice-enabled device for "listening to" and/or responding to a voice command of a user.

Although the techniques described below describe the use of SNR values for audio data, any other type of audio-signal metric may additionally, or alternatively, be utilized for determining device clusters. For instance, voice energy-levels in audio data, noise energy-levels in audio data, and so forth, may be utilized to determine device clusters. Further, while k-means clustering is described as being used to determine device clusters, any other type of technique, algorithm, etc. (e.g., other unsupervised learning algorithms) may be utilized to determine device clusters. Additionally, although some of the techniques may be described as being performed locally at a voice-enabled device, and/or remotely at a speech-processing system, any of the techniques may be performed locally, and any of the techniques may be performed remotely.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic diagram 100 of an illustrative environment 102 in which a user 104 issues a voice command 106, multiple voice-enabled devices 108 detect the voice command 106, and a remote system 110 determines device clusters for the voice-enabled devices 108.

As illustrated, the environment 102 may comprise into two different rooms 102(1) and 102(2), where each of the rooms 102 include multiple of the voice-enabled devices 108(1)-108(N) (collectively "voice-enabled devices 108"). Further, each of the rooms 102 may include secondary devices 112, such as a television 112(1) located in one of the rooms 102(1), and the other room 102(2) may include a refrigerator 112(2) and an oven 112(N). One or more of the voice-enabled devices 108 may be associated with each of the secondary devices 112, such as through a wireless connection (e.g., Bluetooth, ZigBee, etc.) with each of the secondary devices 112. The voice-enabled devices 108 may control operations of the secondary devices 112 based on commands included in the voice commands 106 of the user 104 that are processed by the remote system 110.

The remote system 110 may process audio data (or audio signals) received from the voice-enabled devices 108 and formulate responses to the user 104 along with determining which of the voice-enabled devices 108 is to perform an action responsive to the voice command 106. The remote system 110 may be implemented as one or more computing devices including one or more servers, desktop computers, laptop computers, or the like. In one example, the remote system 110 is configured in a server cluster, server farm, data center, mainframe, cloud computing environment, or a combination thereof. To illustrate, the remote system 110 may include any number of devices that operate as a distributed computing resource (e.g., cloud computing, hosted computing, etc.) that provides services, such as storage, computing, networking, and so on.

The room 102(1) may include the user 104 that is speaking the voice command 106, and the voice-enabled devices 108(1)-(3) located in the room 102(1) may detect or receive the voice command 106. For example, the voice-enabled devices 108 may each have one or more microphones that are used to capture user speech, such as the voice command 106, and one or more speakers that are used to play speech (e.g., dialogue) and content. In some embodiments, the voice-enabled devices 108 may be designed to operate from a fixed location, and in other embodiments, the voice-enabled devices 108 may be portable or mobile. For instance, the voice-enabled devices 108 may comprise handheld devices or other mobile devices, such as smartphones, tablet computers, media players, personal computers, wearable devices, various types of accessories, and so forth.

As illustrated, the user 104 may be located in and speak the voice command 106 in the room 102(1) that includes the voice-enabled devices 108(1)-(3). In such examples, each of the voice-enabled devices 108(1)-(3) may each detect, or receive, the voice command 106, generate respective audio data 114(1), 114(2), and 114(3) (collectively "audio data") representing the voice command 106, and transmit, stream, or otherwise send the audio data 114 over a network 118 to the remote system 110. The voice-enabled devices 108 may receive commands from the user 104 via the voice command 106, and provide services in response to the commands. In some examples, the voice-enabled devices 108 may detect a predefined trigger expression or word (e.g., "awake"), which may be followed by instructions or directives (e.g., "please end my phone call," "please turn off the alarm," etc.). Services provided by the voice-enabled devices 108 in conjunction with the remote system 110 may include performing actions or activities, rendering media, obtaining, and/or providing information, providing information via generated or synthesized speech via the voice-enabled devices 108, initiating Internet-based services on behalf of the user 104, and so forth.

In this example, the voice-enabled devices 108(1)-(3) may receive or capture sound corresponding to the voice command 106 of the user 104 via one or more microphones. In certain implementations, the voice command 106 may include or be preceded by a wakeword or other trigger expression or event that is spoken by the user 104 to indicate that subsequent user speech is intended to be received and acted upon by the voice-enabled devices 108 and/or remote system 110. The voice-enabled devices 108 may detect the wakeword and begin sending audio data 114 to the remote system 110. In some instances, the voice-enabled devices 108 may operate in a low-functionality mode and analyze sound using ASR processing. When the wakeword is detected using ASR, the voice-enabled devices 108 may begin sending the audio data, and other respective metadata 116(1), 116(2), and 116(3) (collectively "metadata 116"), to the remote system 110. The wakeword may be a reserved keyword that is detected locally by the voice-enabled devices 108, such as by using an expression detector that analyzed audio signals produced by the microphones of the voice-enabled devices 108 using ASR techniques to detect the wakeword, which generally may be a predefined word, phrase, or other sound. Such an expression detector may be implemented using keyword spotting technology, as an example. A keyword spotter is a functional component or algorithm that evaluates an audio signal to detect the presence a predefined word or expression in the audio signal. Rather than producing a transcription of the words of the speech, a keyword spotter generates a true/false output to indicate whether or not the predefined word or expression was represented in the audio signal.

In the example illustrated in environment 102, the user 104 issues the voice command 106 subsequent to a wakeword, which the voice-enabled devices 108(1), 108(2), and 108(3) each detect or capture. However, voice-enabled devices 108(4) and 108(N) may not detect the voice command 106 as they are positioned in the other room 102(2). Each of the voice-enabled devices 108(1), 108(2), and 108(3) produce respective audio data 114 representing the voice command 106. In some examples, the audio data 114 may represent other sounds that may trigger a response, such as glass breaking, an appliance beeping, a smoke alarm sounding, a baby crying, etc. Additionally, the voice-enabled devices 108(1), 108(2), and 108(3) may each determine various respective metadata 116(1), 116(2), and 116(3), or determine additional metadata associated with the voice command 106, and/or the circumstances involving the voice-enabled devices 108(1), 108(2), and 108(3)).

As one example, the voice-enabled devices 108(1), 108(2), and 108(3) may be located at different locations and at different distances from the user 104. In these circumstances, each of the voice-enabled devices 108(1), 108(2), and 108(3) may be able to detect the voice command 106, but the audio data 114 generated by each of the voice-enabled devices 108(1), 108(2), and 108(3) may have different metadata 116. The metadata 116 may comprise any type of data associated with its respective audio data 114 and/or its respective voice-enabled device 108. For instance, the metadata 116 may indicate a characteristic, metric, etc., of associated audio data 114, such as a signal-to-noise value, a spectral centroid measure, a voice-energy level, a noise-energy level, a spectral flux, a particular percentile frequency, a clarify, a harmonicity, the level of voice presence detected in the audio signal, an amplitude of the audio signal, etc. As illustrated in FIG. 1, each of voice-enabled devices 108(1), 108(2), and 108(3) may send respective audio data 114(1), 114(2), and 114(3), and respective metadata 116(1), 116(2), and 116(3), to the remote system 110.

Herein, each of the voice-enabled devices 108(1), 108(2), and 108(3) may initiate communication with the remote system 110 to process the voice command 106 by sending the audio data 114 that are determined at the respective voice-enabled device 108 and metadata 116 for each of the different audio data 114. Each of the different metadata 116 may generally indicate a characteristic of an associated audio data 114, such as a signal-to-noise ratio, a spectral centroid measure, a speech energy level, a spectral flux, a particular percentile frequency, a clarify, a harmonicity, the level of voice presence detected in the audio signal, an amplitude of the audio signal, etc. As illustrated in FIG. 1, each of voice-enabled devices 108(1), 108(2), and 108(3) may send audio data 114(1), 114(2) and 114(3), and metadata 116(1), 116(2), and 116(3) to the remote system 110.

In various examples, the audio data 114 and the metadata 116 may be sent to the remote system 110 over one or more networks 118. The one or more networks 118 may include any viable communication technology, such as wired and/or wireless modalities and/or technologies. Networks 118 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

In some examples, the remote system 110 may include one or more processors 120 and computer-readable media 122 storing various components for determining which voice-enabled devices 108 is to listen to and/or respond to a command in the voice command 106. The processors 120 may power the components of the remote system 110, such as components stored in the computer-readable media 122. In some examples, the computer-readable media includes an arbitration component 124 which determines which of the multiple audio data 114 received will be used for further processing. Generally, audio data 114 or signals with certain characteristics or qualities are easier for speech-processing techniques. For example, many speech-processing techniques often include transcribing, or converting, the audio data 114 representing voice commands 106 into text. Audio data 114 that represents the voice command 106 with better quality or accuracy may result in more accurate transcription of the voice command 106 into text. For instance, audio data 114 with higher signal-to-noise values or ratios may represent the voice command 106 better than the background noise, which makes transaction of the audio data including the voice command 106 into text. Thus, the arbitration component 124 may analyze the metadata 116 and/or the audio data 114 received from each of the voice-enabled devices 108(1)-(3) and determine which audio data 114 has the highest SNR value, or other audio or acoustic metric, and select that audio data 114 for further processing. The arbitration component 124 may further send an instruction for the voice-enabled devices 108 whose audio data 114 was not selected to stop sending the audio data 114. In this way, when multiple voice-enabled devices 108 detect or capture a same voice command 106, the arbitration component 124 may select or utilize the audio data 114 with a higher quality representation of the voice command 106, and stop the other voice-enabled devices 108 from transmitting their respective audio data 114.

However, each of the audio data 114 and/or the metadata 116 from each of the voice-enabled devices 108 may be stored at the remote system 110, such as in an audio-data database 126. The audio-data database 126 may store, for each of the voice-enabled devices 108, device identifiers (IDs) 128 for each of the devices 108, and metadata 116 for each of the audio data 114. For instance, each of the voice-enabled devices 108 may have their device IDs 128 stored with associated metadata 116 for their audio data 114, such as timestamp data 130 indicating times at which the audio data 114 was received at the remote system 110, and SNR data 132 indicating energy levels for the voice command 106 represented in the audio data 114, energy levels for noise represented in the audio data 114, and/or ratios (e.g., SNR ratios/values) between the voice command 106 and background noise. However, other types of metadata 116 may be stored and associated with respective device IDs 128. Thus, the audio-data database 126 stores metadata 116 each time, or for each instance, that a voice-enabled device 108 transmits or otherwise sends audio data 114 to the remote system 110. In some examples, the voice-enabled devices 108 may determine some of the metadata, such as the SNR data 132, and in other examples the remote system performs processing to determine additional metadata 116, such as the SNR data 132.

The computer-readable media 122 may further store a device-clustering component 134 that is executable by the processors 120 to determine how to group, or cluster, the voice-enabled devices 108. For example, the device-clustering component 134 may analyze the data stored in the audio-data database 126 to determine how to cluster the voice-enabled devices 108 into device clusters. Generally, a device cluster may comprise a grouping, or other stored association, indicating that the voice-enabled devices 108 in the device cluster are associated with each other. For instance, a device cluster may indicate that the voice-enabled devices 108 in the cluster are in a same building, a same room, or otherwise in proximity to each other. The device-clustering component 134 may analyze various data, such as the timestamps 130 for each of the audio data 114 received from the voice-enabled devices 108 and/or SNR data associated with the audio data 114.

In some examples, the device-clustering component 134 may perform a "more aggressive" approach to determining a device cluster where the device-clustering component 134 analyzes the timestamp data 130 for multiple voice-enabled devices 108, determines that the audio data 114 received from each of the multiple voice-enabled devices 108 were received within a threshold period of time (e.g., 1 second, 3 seconds, 10 seconds, etc.), and create and store, in a device-cluster database 136, a device cluster 138 including the multiple voice-enabled devices 108. Stated otherwise, the device-clustering component 134 may determine that, because each of the voice-enabled devices 108(1)-(3) sent audio data 114 in a relatively short window of time, the voice-enabled devices 108(1)-(3) detected the same voice command 106 from the user 106, and are thus in a same environment, or room 102(1).

In some examples, the device-clustering component 134 may perform the more aggressive form of determining a device cluster by analyzing a single instance where timestamps 130 for audio data 114 received from multiple voice-enabled devices 108 were received within the same window of time. For instance, if the voice-enabled devices 108(1)-(3) detected the same voice command 106 only once, and sent respective audio data 114(1), 114(2), and 114(3) to the remote system 110 within the threshold period of time, the device-clustering component 134 may determine to create/generate a device cluster 138, and store the device cluster 138 in the device-cluster database 136 after the single instance.

However, in some examples the device-clustering component 134 may store timestamp data 130 for each of the voice-enabled devices 108 each instance the remote system 110 received audio data 114 from at least one of the voice-enabled devices 108. The remote system 110 may then analyze the timestamp data 130 for a large group of the instances (e.g., 50 instances, 100 instances, 300 instances, etc.) where the remote system received audio data 114 from at least one of the voice-enabled devices 108. In such examples, the device-clustering component 134 may determine, based on the timestamps 130 for the larger group of instances, how often timestamps 130 for the multiple voice-enabled devices 108 indicate that audio data 114 was received from the multiple devices 108 within the defined window of time, or threshold period of time. The device-clustering component 134 may create a device cluster 138 for the various devices 108 using different metrics when analyzing the timestamp data 130 for the large group of instances. For example, the device-clustering component 134 may create a device cluster 138 for multiple voice-enabled devices 108 if the timestamp data 130 indicates that the multiple voice-enabled devices 108 each transmitted audio data within the threshold period of time more than some predefined period of times (e.g., after 50 times, after 100 times, etc.). As another example, the device-clustering component 134 may create a device cluster 138 for multiple voice-enabled devices 108 if the timestamp data 130 indicates that, for the group of instances, the multiple voice-enabled devices 108 each transmitted audio data 114 within the window time more than a threshold percentage of the instances in the group of instances (e.g., more than 50% of the instances, more than 75% of the instances, etc.).

In some examples, the device-clustering component 134 may utilize other types of metadata 116 to determine and create device clusters 138 for multiple voice-enabled devices 108. For example, the device-clustering component 134 may further utilize audio-data metric values to determine device clusters 138, such as signal-to-noise (SNR) values 132 for the audio data 114. Generally, SNR values 138 for the audio data 114 may represents the energy level of the voice command 106 of the user 104 in the audio data 114 versus the energy level of noise included in the audio data 114. In such examples, the device-clustering component 134 may utilize a "less aggressive" approach to determining a device cluster where, not only must voice-enabled devices 108 detect the same voice commands 106 at a threshold rate, or more than a threshold amount, to be included in the device cluster 136, but the respective SNR values 132 for the different audio data 114 may also be within some threshold amount from each other to create a device cluster 138.

The device-clustering component 134 may receive in the metadata 116, or determine, the SNR values 132 for the audio data 114 received from each of the voice-enabled devices 108. The device-clustering component 134 may receive audio data 114 from multiple voice-enabled devices 108 within the window of time, and analyze the SNR values 132 for the different audio data 114. Before creating a device cluster 138 for the multiple voice-enabled devices 108, the device-clustering component 134 may determine whether the SNR values 132 are within a threshold value (e.g., 50% similar, 70% similar, 90% similar, etc.). In this way, the device-clustering component 134 may determine that, not only are the multiple voice-enabled devices 108 able to detect the same voice commands 106 from the user 104, but the multiple voice-enabled devices 108 are also close enough in proximity to warrant creation of a device cluster 138 for the multiple voice-enabled devices 108. For example, a house may have a large room where the kitchen is connected to a living room such that a voice-enabled device 108 in the kitchen detects the same voice commands 106 as a voice-enabled device 108 located across the room in the living room. In such an example, the SNR values 132 for audio data 114 transmitted by the two voice-enabled devices 108 may not be within the threshold value, and the device-clustering component 134 may refrain from creating a device cluster 138 for the devices 108. In some examples, this "less aggressive" approach to creating device clusters 138 may be advantageous. For example, a user 104 in the living room may issue a voice command 106 of "Please turn off," intending that the voice-enabled device 108 in the living room turn off a television in the living room. If the more aggressive approach for determining a device cluster had been utilized by the device-clustering component 134, the voice-enabled device 108 in the kitchen may have been selected to respond to the voice command 106, and may have turned off an oven in the kitchen. However, depending on the user 104, the environment, and other factors, any one of the techniques for determining a device cluster described herein may be utilized.

In some examples, the device-clustering component 134 may utilize a confidence value using both of the timestamps 130 and the SNR data 132 to determine whether to create a device cluster 138. For example, a confidence score may be calculated by the device-clustering component 134 based on how often multiple voice-enabled devices 108 send audio data 114 at the same time, based on the time stamps 130. The voice-enabled devices 108 detect the same voice command 106 at a higher rate (e.g., 90% of the time), then the confidence value may be greater than if the voice-enabled devices detect the same voice command 106 at a lower rate or percentage of the time (e.g., 40%). The confidence value determined based on the timestamps 130 may then be weighted based on the SNR data 132. For instance, if the SNR data 132 for the instances where the multiple voice-enabled devices 108 detected the same voice command 106 are within some threshold value a high percentage of the time, then the confidence score may be higher, and vice-versa. In this way, the device-clustering component 134 may utilize rates at which the multiple voice-enabled devices 108 detect the same voice command 106 in combination of rates at which the SNR values 132 are within the threshold amount.

In some examples, the threshold amount that the SNR values 132 are to be within for creation of a device cluster 138 may be determined based on various factors. For instance, depending on how "noisy" an environment is, or how close in proximity a user 104 wants their devices 108 to be for a device cluster 138 to be made, the threshold value that the SNR values 132 for the audio data 114 from each of the devices 108 may be determined and/or modified.

In various examples, the device-clustering component 134 may determine that the SNR values 132 are both greater than a threshold SNR value. This may indicate that the voice-enabled devices 108 each heard the user at a similar energy level, and/or have similar amounts of background noise, which may indicate that the devices 108 are in close proximity to each other. Thus, the device-clustering component 134 may create a device cluster 138 for devices whose SNR values 132 are greater than or equal to a threshold SNR value (e.g., 1, 2, 5, etc.)

In some examples, the device-clustering component 134 may modify existing device clusters 138 by adding new devices 108 to the clusters 138, and/or removing devices 108 included in the clusters 138. For instance if a voice-enabled device 108 is introduced into the room 102(1) and begins to send audio data 114 to the remote system 110 at a same time as the other devices 108(1)-(N), the device-clustering component 134 may determine to add the new voice-enabled device 108 to the existing device cluster 138 that includes the voice-enabled devices 108(1)-(N). Similarly, the device-clustering component 134 may determine to remove a device 108 from a device cluster 138. If the device-clustering component 134 determines that the voice-enabled device 108 has stopped sending audio data 114 at the same time as other voice-enabled devices 108 in the device cluster 138, the device-clustering component 134 may remove the voice-enabled device 108 from the device cluster 138. Thus, the device-clustering component 134 may periodically determine whether devices 108 need to be removed and/or added to a device cluster 138. The device-clustering component 134 may analyze the timestamps 130 and/or SNR data 132 in a sliding window, such as by considering only certain audio data 114 that has been received more recently (e.g., within the last month, within the last 100 instances of receiving audio data 114, etc.).

The device-clustering component 134 may further store cluster metadata with each of the device clusters 138 to further provide information about a device cluster 138. For example, the cluster metadata 140 may include information such as device names for devices 108 included in the device cluster 138 (e.g., "kitchen device," "living room device," etc.). Further, indication of the types of commands often requested by a user 104 for particular devices 108 may be utilized, such as commands to turn on/off ovens versus commands to turn on/off televisions. This information may indicate what type of environment a voice-enabled device 108 is in, and thus, what environment a device cluster 138 is in. Even further, the device-clustering component 134 may be configured to determine identities of users 104 who commonly use a device 108. For instance, if a child often uses a particular voice-enabled device 108, it may be determined that the voice-enabled device 108, and any cluster 138 it is included in, is located in a bedroom of the child.

The device clusters 138 may be created for various groupings of voice-enabled devices 108. For example, device cluster 138 may be created based on the device IDs for the voice-enabled devices 108. The device-clustering component 134 may determine device IDs for the voice-enabled devices 108 who often wake up at the same time, and create device clusters 138 based on device IDs. In some examples, the device-clustering component 134 may determine customer IDs for users 104 of the voice-enabled devices 108. For instance, a user 104 may create a customer ID with an operator of the remote system 110, and register their voice-enabled devices 108 under that customer ID. The device-clustering component 134 may limit which voice-enabled devices 108 it considers from the audio-data database 126 to devices registered under the same customer ID for the user 104.

As illustrated in FIG. 1, the device-clustering component 134 may have analyzed the audio-data database 126 and determined that the voice-enabled devices 108(1)-(3) are to be included in the same device cluster 138, and the voice-enabled devices 108(4) and 108(N) are to be included in the same device cluster 138. In such examples, the device-clustering component 134 may generate and/or store a device cluster 138 that groups voice-enabled devices 108 (1)-(3), and generate and/or store a device cluster 138 that groups voice-enabled device 108(4) and 108(N). Further, the device-clustering component 134 may determine cluster metadata 140 for each of the device clusters 138. As an example, the device-clustering component 134 may determine that common voice commands 106 for the device cluster 138 including voice-enabled devices 108(1)-(3) are to "turn on the television," and store an indication that the device cluster 138 for those devices 108(1)-(3) are in a living room. Similarly, the device-clustering component 134 may determine that common voice commands 106 for the voice-enabled devices 108(4) and 108(N) are to "turn on the oven," "order more milk," or "look up a recipe," and store an indication in the cluster metadata 140 that the device cluster 138 for the devices 108(4) and 108(N) are in a kitchen.

Figure 3A:
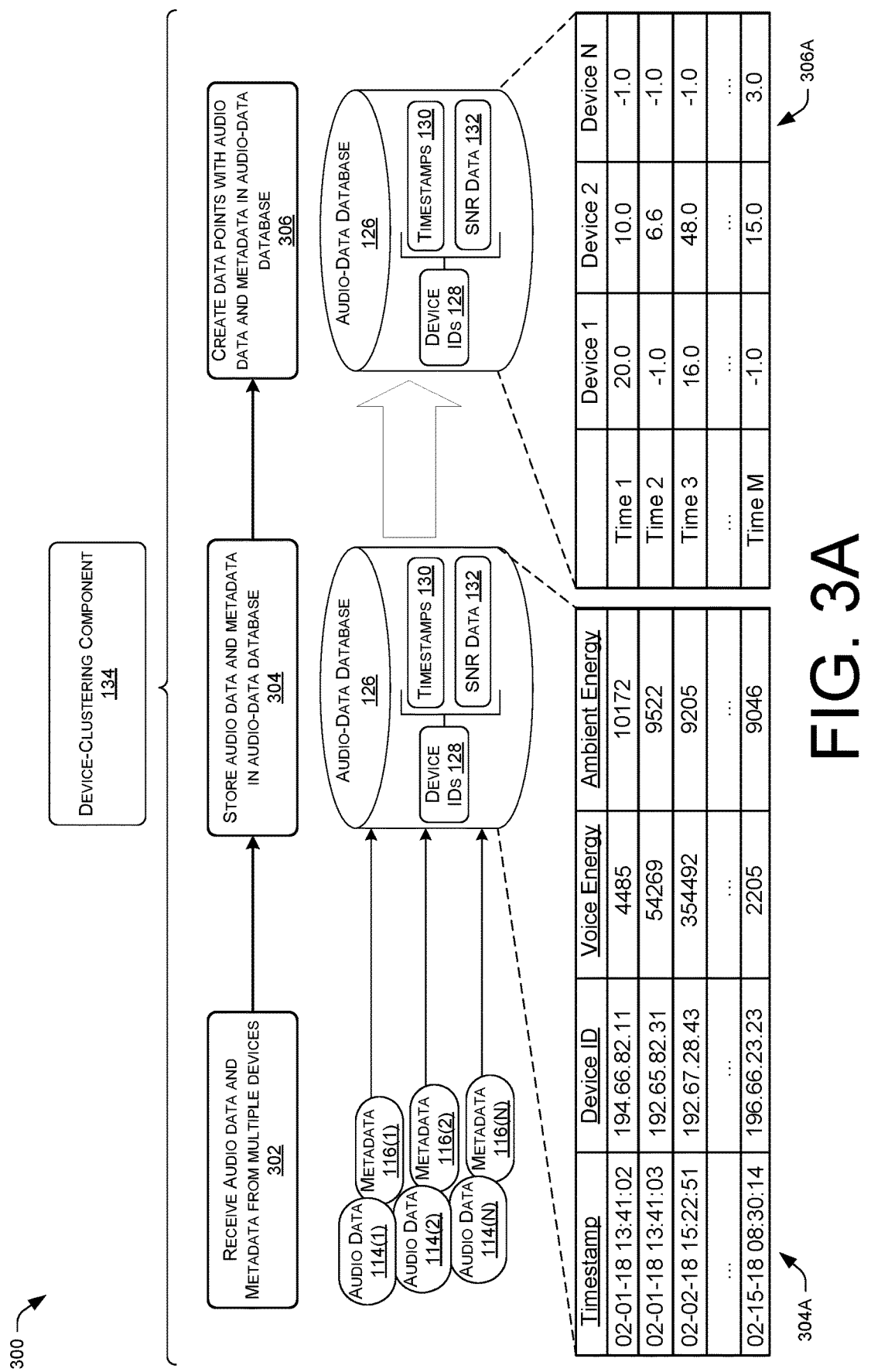
FIGS. 3A and 3B illustrate a flow diagram of an example method for utilizing audio data received from multiple voice-enabled devices, and metadata associated with the audio data, to determine device clusters for the voice-enabled devices.
Figure 3B:
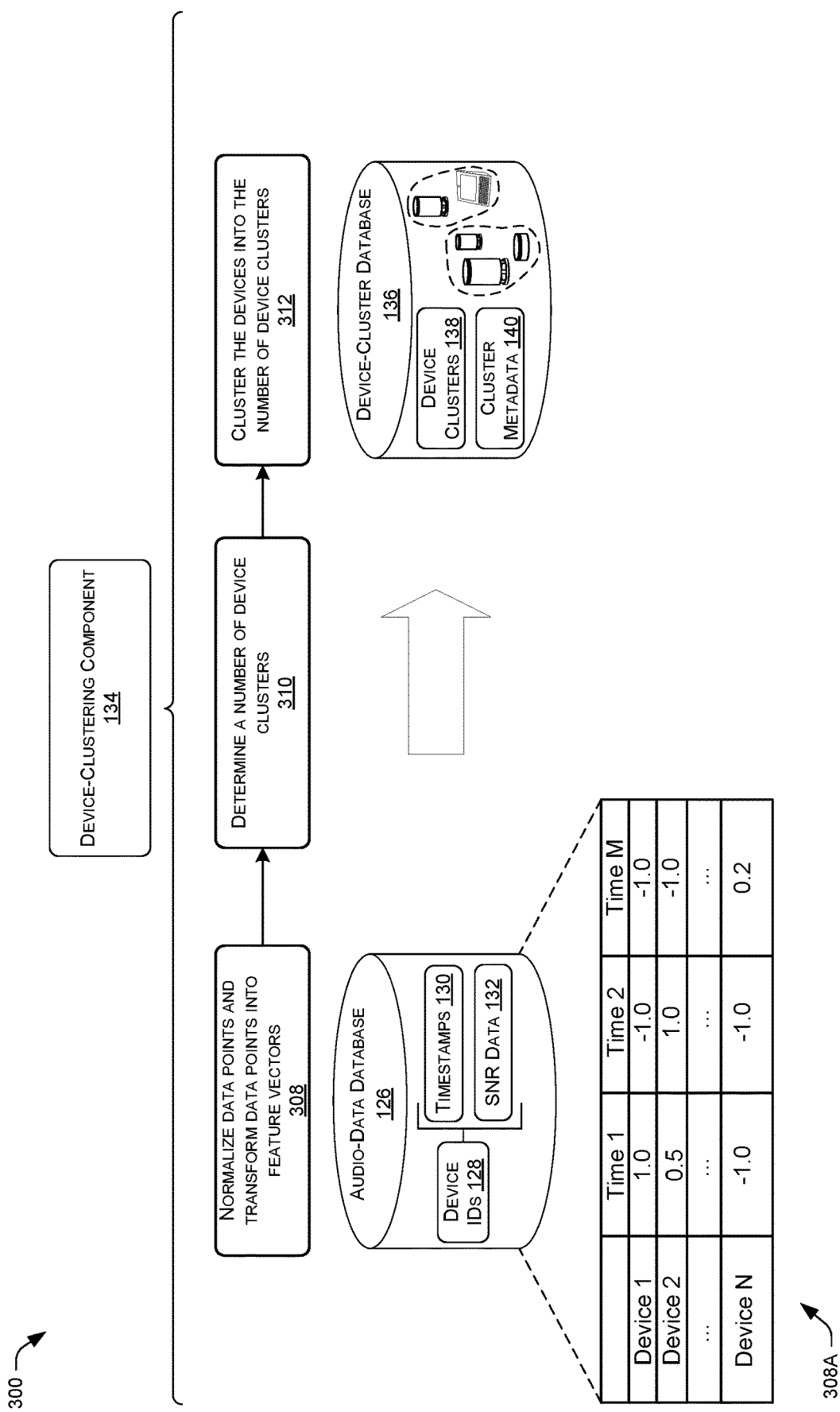

As described in more detail with respect to FIGS. 3A and 3B, the device-clustering component 134 may utilize various algorithms to determine how many device clusters 138 to create for a given group of voice-enabled devices 108, and how to cluster or assign the voice-enabled devices 108 to the number of device clusters 138 determined for the group of devices 108. For example, device-clustering component 134 may execute one or more algorithms to determine device clusters 138 based on a mathematical or statistical analysis of metadata (e.g., timestamps 130, SNR data 132, etc.) for a group of instances where at least one of multiple voice-enabled devices 108 transmitted audio data 114 to the remote system 110. For instance, the device-clustering component 134 may associate each of the voice-enabled devices 108 with respective timestamp data 130 and SNR values 132 for each instance where audio data 114 was received by the remote system 110. The device-clustering component 134 may then execute, for example, a k-means clustering algorithm to partition the multiple voice-enabled devices 108 into one or more device clusters 138 based on their associated metadata using techniques similar to those described above. Further, the device-clustering component 134 may dynamically determine, or estimate, a number of device clusters 138 to be used for multiple voice-enabled devices 108 of a user 104. For instance, the device-clustering component 134 may utilize gap statistic estimation to determine a number of device clusters 140 to create for voice-enabled devices 108 of a user 104, and provide the number of device clusters 138 as an input into the k-means clustering algorithm.

In some examples, the device-clustering component 134 may additionally, or alternatively, use other types data to determine device clusters 138. For example, the voice-enabled devices 108, and/or other device s in the environments 102(1) and 102(2), may send data to the remote system 110 that may be used by the device-clustering component 134 to determine device clusters. For example, the voice-enabled devices 108, along with the remote system 110, may utilize WiFi triangulation techniques to determine whether the voice-enabled devices 108 are in the same environment and should be in the same device cluster 138. Further, the device-clustering component 134 may receive video data, image data, etc., representing the room 102(1), analyze the video/image data, and determine (e.g., using computer vision) which of the voice-enabled devices 108 are to be included in a device cluster 138 based on the video/image data illustrating that the devices 108 are in the same environment. Even further, radar devices, infrared devices, etc., may be utilized to determine data which indicates whether voice-enabled devices 108 are in the same environment, such as the room 102(1). Further, various types of signals, such as Bluetooth Low Energy signals and/or other short-range signals/protocols, may be exchanged, used, etc., by the voice-enabled devices 108 to determine which devices 108 are in the same environment, such as the room 102(1). The device-clustering component 134 may receive this type of data and determine the device clusters 138 using various combinations of the data. For instance, various data may be weighted with different confidence values by the device-clustering component 134 to determine whether voice-enabled devices 108 should be included in device clusters 138. Thus, in addition to, or as an alternative, various types of data may be used along with, or besides, the data in the audio-data database 126. The device-clustering component 134 may be configured to perform sensor fusion techniques to determine the device cluster 138 using the various types of data.

Accordingly, the device-clustering component 134, potentially along with other components, of the remote system 110 may automate techniques for determining how many device clusters 138 to create for a user 104 or customer, and further determine which voice-enabled devices 108 belong to which device cluster 138. In this way, a remote system 110 may determine, generate, and store device clusters 138 for multiple voice-enabled devices 108 of a user 104. The device clusters 138 may then be utilized to help determine an appropriate voice-enabled device 108 for responding to a voice command 106 of a user 104.

For example, the computer-readable media 122 may further include components to perform speech processing on the audio data 114 selected by the arbitration component 124, and utilize the device clusters 138 to help determine which voice-enabled device 108 is to listen to and/or respond to a voice command 106 of the user 104. The computer-readable media 122 may include an orchestration component 138 that calls or communicates with an automatic speech recognition (ASR) component 140, and a natural language understanding (NLU) component 142 for processing the audio data 114. For example, the orchestration component 138 may send the audio data 114 to the ASR component 140, which detects the voice command 106 endpoint and sends a message to the voice-enabled device 108 to instruct the device 108 to stop sending the audio data 114. In some instances, the ASR component 140 of the remote system 110 may process the audio data 114 at to determine textual data which corresponds to the voice command 106. In some examples, the ASR component 140 may generate ASR confidence scores representing the likelihood that a particular set of words of the textual data matches those spoken in the voice command 106. For instance, the ASR component 140 may determine a confidence or likelihood that a particular word which matches the sounds would be included in the sentence at the specified location (e.g., using a language or grammar model). Thus, each potential textual interpretation of the spoken utterance 106 (hypothesis) is associated with an ASR confidence score. The ASR component 140 may then return the textual data to the orchestration component 138. While the metadata 116 is illustrated as being determined at the voice-enabled devices 108, in other examples, some or all of the metadata 116 may be determined by components of the remote system 110, such as ASR component 140, arbitration component 124, and/or NLU component 142. For instance, the voice-enabled devices 108 may send raw audio signals to the remote system 110 representing the voice commands 106 without performing an pre-processing.

In various examples, the textual data corresponding to the voice command 106 may be sent from the orchestration component 138 to the NLU component 142 to be analyzed or processed by the NLU component 142 to determine an intent expressed by the user 104 in the voice command 106. For example, if the user 104 issued a command to "please turn off the alarm," the NLU component 142 may determine that the user's intent is to have a voice-enabled device 108(4) that is outputting an alarm sound turn off the alarm. Once the intent has been determined by the NLU component 142, the orchestration component 138 may pass the intent to a targeting component 144 to use to determine which of the voice-enabled devices 108 is to respond to the voice command 106. In some examples, the ASR component 140 and/or the NLU component 142 may detect various types of sound in the audio data 114 other than, or in combination with, a voice command 106. For instance, rather than a voice command 106 being included in the audio data 114, the ASR component 140 and NLU component 142 may detect sounds such as glass breaking, an appliance beeping, a smoke alarm sounding, a baby crying, and/or other sounds which might map to an intent and/or action for the remote system 110 to perform.

The targeting component 144 may determine which voice-enabled device 108 is to respond to the voice command 106 based on the intent received from the NLU component 142, and potentially other data. For instance, the targeting component 144 may determine device clusters 138 stored or indicated in the device-cluster database 136. The device clusters 138 may be utilized by the targeting component 144 to select a voice-enabled device 108 that is able to respond to the voice command 106. For instance, the NLU component 142 may determine that the voice command 106 includes an intent for a voice-enabled device 108 to "lower the volume." However, the device 108 whose audio data 114 was utilized by the ASR component 140 and NLU component 142 may be in a state where it is not able to lower volume. For instance, the audio data 114 from the voice-enabled device 108(3) may be selected by the arbitration component 124 and used by the ASR component 140 and the NLU component 142. However, because the voice-enabled device 108(3) is not outputting any sound from music, videos, etc., the voice-enabled device 108(3) is not able to appropriately respond to the user's command 106 to lower the volume. Thus, the targeting component 144 may determine whether the voice-enabled device 108(3) is in a device cluster 138. The targeting component 144 may determine that the voice-enabled device 108(3) is in a device cluster 138 with the voice-enabled devices 108(1) and 108(2). The targeting component 144 may further determine that the voice-enabled device 108(2) is outputting sound, and determine that it likely the user 104 intended for the volume to be lowered for the sound being output by the voice-enabled device 108(2) whose SNR values 132 may have been lower due to the sound being output by the voice-enabled device 108(2). Further, the device cluster 138 may prevent devices from being acted on, or performing operations, that the user 104 did not intend to perform an operation. For example, if no device clusters 138 were formed for the devices 108(1)-108(N), the targeting component 144 may determine that voice-enabled device 108(4) is also outputting sound, and may turn down the volume on that voice-enabled device 108(4). However, that voice-enabled device 108(4) is in the other room 102(2), and may be outputting sound for another user in that room 102(2). Using device clusters 138, the targeting component 144 is able to determine that the voice-enabled device 108(4) is in a different device cluster 138, or at least is not included in a device cluster 138 of the voice-enabled device 108(3). Upon determining a voice-enabled device 108 to perform the command, the targeting component 144 may provide an indication of the intent and device 108 to the command processor 146.

The command processor 146 may include one or more domain speechlets which determine and generate a response for the selected voice-enabled device 108 to perform. In some examples, the command processor 146 may route identified intents to the appropriate speechlets. For example, the speechlets may be specialized software, domains, and/or devices for responding based on various intents, such as a music domain (e.g., Amazon Music, Pandora, Spotify, etc.), a video domain (e.g., Amazon Video, HBO, Netflix, Hulu, etc.) household organization domain (e.g., calendars, reminders, timers, alarms, etc.), and other types of domains. For example, an intent may include a command to play music (play music intent), the command processor 146 may route the intent to a music domain speechlet configured to execute a music playing command.

Once the command processor 146 has generated a command, the command processor 146 may provide the command in a response to the determined voice-enabled device 108 to cause the voice-enabled device 108 to perform an operation.

The actions described herein are performed with respect to five voice-enabled devices 108 in the rooms 102(1) and 102(2). However, any number of voice-enabled devices 108 may be used and handled in the same manner, where the rules and processes performed are scalable to account for less, or additional voice-enabled devices 108. As described, the voice-enabled devices 108 need not detect the voice command 106 at all, but still be selected to perform the response based on their inclusion in a device cluster 138 with a device 108 that detected the voice command 106. For instance, a remote voice-enabled device 108 may be located across the room 102(1) from the user 104 and not detect the voice command 106. The remote voice-enabled device 108 may be, for example, outputting an alarm sound, or conducting a phone call. While the user 104 is not near the remote voice-enabled device 108, the user 104 may instruct another of the voice-enabled devices 108 to turn off the alarm, or hang up the phone call. The remote voice-enabled device 108 may still be selected to perform the response despite not detecting the voice command 106 and transmitting an audio signal 114.

The remote system may further include one or more network interfaces 148 to receive data, such as audio data 114 and metadata 116, from devices. the network interface (s) 148 may include wired or wireless interfaces, such as a wireless or Wi-Fi network communications interface, an Ethernet communications interface, a cellular network communications interface, a Bluetooth communications interface, etc., for communications with the voice-enabled devices 108 over various types of networks 118, including wide-area network, local-area networks, private networks, public networks etc. In the case of a wireless communications interfaces, such interfaces may include radio transceivers and associated control circuits and logic for implementing appropriate communication protocols.

In some examples, rather than determining that the voice-enabled devices 108 detected a voice command 106 at a same time based on receiving audio data 114 at a same time, the remote system may send a command to one of the voice-enabled devices 108 to send out an alarm sound or other noise that the voice-enabled devices 108 are able to detect. For instance, if voice-enabled device 108(2) sends out an alarm sound, and the voice-enabled devices 108(1) and 108(3) each detect the sound and sent an indication that they detected the sound to the remote system, then the device-clustering component 136 may determine that the voice-enabled devices 108(1)-(3) are in a same room 102(1) and are to be included in a device cluster 138.

Figure 2A:
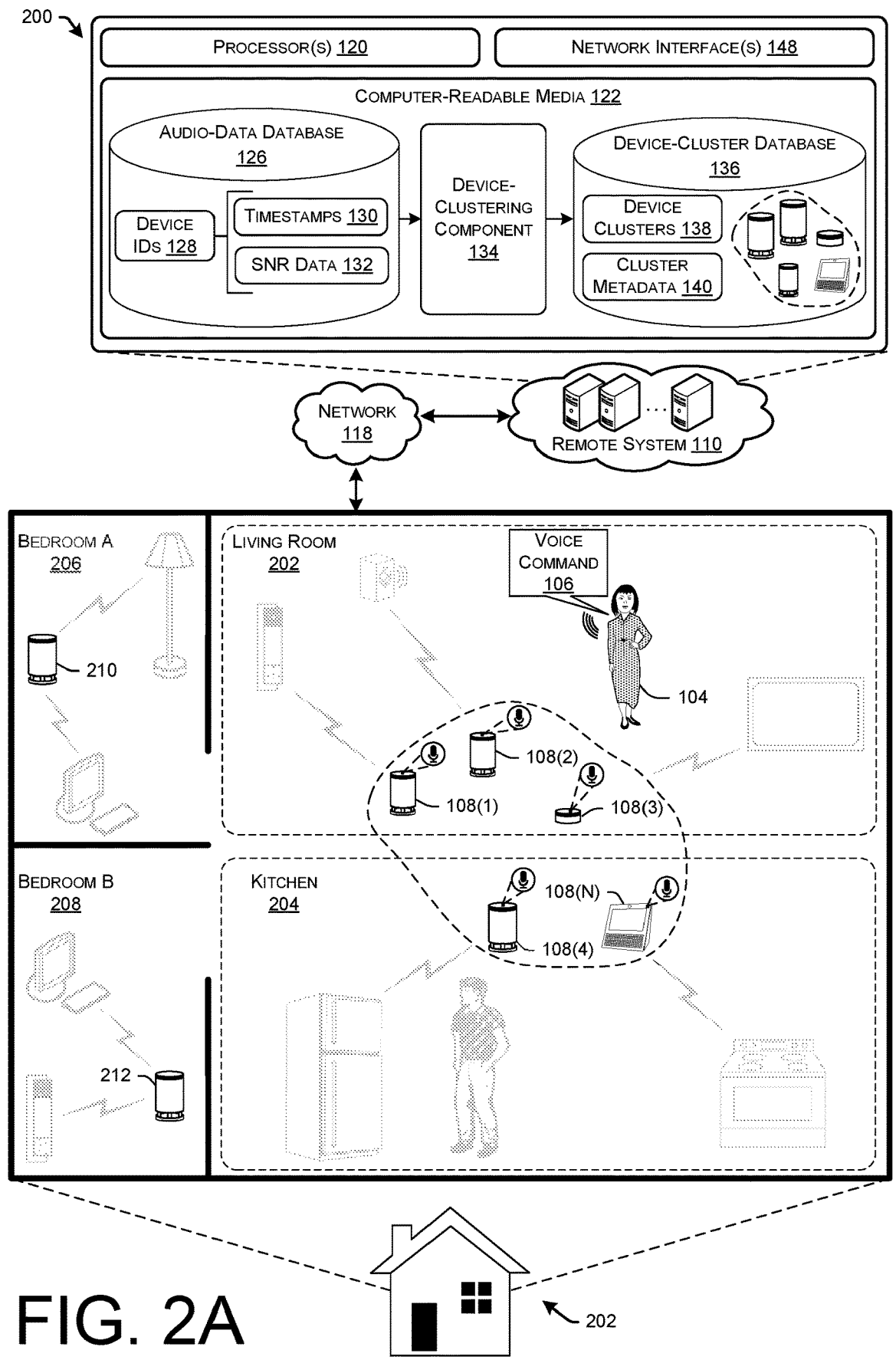
FIGS. 2A and 2B illustrate schematic diagrams of illustrative environments in which a remote system determines device clusters for voice-enabled device using various device-clustering techniques.
Figure 2B:
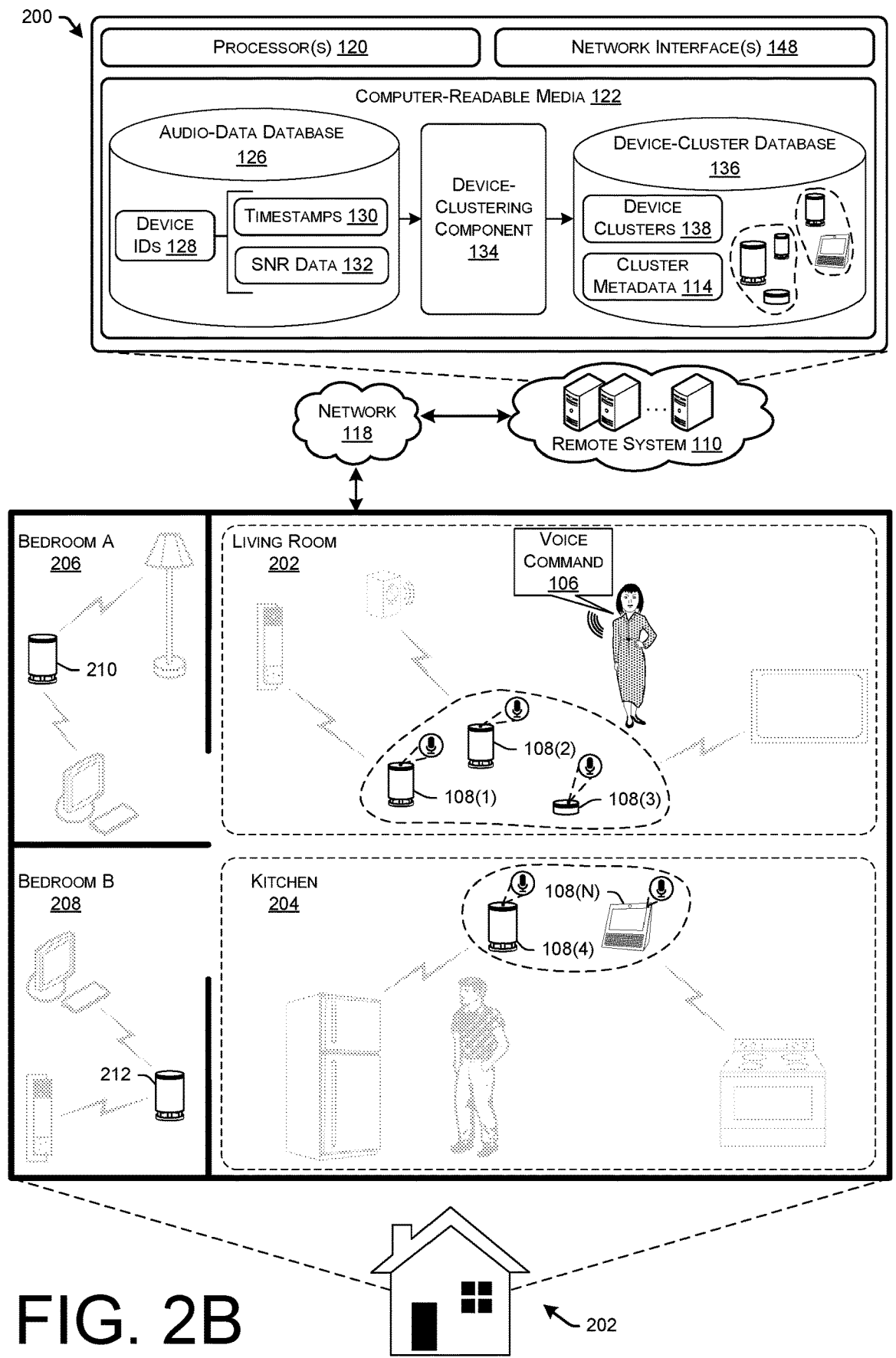

FIGS. 2A and 2B illustrate schematic diagrams of illustrative environments 200 in which a remote system determines device clusters for voice-enabled device using various device-clustering techniques.

As illustrated in FIG. 2A, the illustrative environment 200 includes a home 202 of a user 104, and the home 202 includes a living room 202, a kitchen 204, and two bedrooms, bedroom A 206 and bedroom B 208. As illustrated, each of the living spaces of the home 202 include various devices. For instance, the living room 202 includes secondary devices 112 such as a television, a speaker, and an imaging device, along with voice-enabled devices 108(1), 108(2), and 108(3). The kitchen 204 includes secondary devices 112, such as a refrigerator and an oven, along with voice-enabled devices 108(4) and 108(N). Bedroom A 206 may include a respective voice-enabled device 210 controlling secondary appliances 112, such as a personal computing device and a lamp, and bedroom B 208 may include another voice-enabled device 212 controlling secondary devices, such as a personal computing another imaging device.

FIG. 2A illustrates an example where the device-clustering component 134 of the remote system 110 may have utilized the more aggressive form of determining a device cluster to create a device cluster 138 including the voice-enabled devices 108(1)-(3) in the living room 202, as well as the voice-enabled devices 108(4) and 108(N) in the kitchen 204. For example, over time the remote system 110 may have received audio data 114 from each of the voice-enabled devices 108(1)-(N) for many different instances or voice commands 106. The remote system 110 may have stored the audio data 114 and respective metadata 116 in the audio-data database 126 to be utilized to determine device clusters 138. The device-clustering component 134 may be configured to analyze the data stored in the audio-data database 126, such as the timestamps 130, to determine whether a device cluster 138 should be generated, and which of the devices 108 should be included in the device cluster 138. In the illustrated example, the device-clustering component 134 determined that all of the voice-enabled devices 108(1)-108(N) are to be included in a single device cluster 138. For instance, the device-clustering component 134 may determine, based on the timestamp data 130 for instances of receiving audio data 114 from each of the voice-enabled devices 108(1)-(N), that the voice-enabled devices 108(1)-(N) all detected a same voice command 106. Similarly, the device-clustering component 134 may determine that, for a group of instances of receiving audio data 114 from each of the voice-enabled devices 108(1)-(N), the voice-enabled devices 108(1)-(N) detected the same voice command 106 higher than a threshold percentage of the time they sent audio data 114.

Further, the device-clustering component 134 may have determined that, not only do the voice-enabled devices 108(1)-(N) detect the same voice commands 106 at more than a threshold amount, but that the SNR data 132 for the audio data 114 from each of the voice-enabled devices 108(1)-(N) is within some threshold value that indicates the devices are within a certain proximity and warrant a device cluster 138.

In some examples, the device-clustering component 134 may have determined that, not only do the voice-enabled devices 108(1)-(N) detect the same voice commands 106 at more than a threshold amount, but that the SNR data 132 for the audio data 114 from each of the voice-enabled devices 108(1)-(N) are greater than or equal to a threshold SNR value. This may indicate that the audio data 114 includes similar energy levels for data representing speech of the user 104, and similar energy levels for data representing background noise.

FIG. 2B illustrates another illustration of the home 202 where the device-clustering component 134 determines to create two device clusters 138 for the group of voice-enabled devices 108(1)-(N). Using similar techniques, the device-clustering component 134 may determine that the voice-enabled devices 108(1)-(3) detect the same voice commands 106, or detect the same voice commands 106 at a rate higher than a threshold rate (e.g., more than half of the time, more than 70% of the time, etc.). Similarly, the device-clustering component 134 may have determined that the voice-enabled devices 108(4) and 108(N) each detect the same voice commands 106, or detect the same voice commands 106 at a rate higher than the threshold rate. Further, the device-clustering component 134 may utilize the less aggressive technique for determining a device cluster where the SNR data 132 is utilized to determine whether SNR values for the audio data 114 received from the voice-enabled devices 108 is within some threshold value or amount. The device-clustering component 134 may cluster the devices 108 into two devices clusters 138 as illustrated in FIG. 2B.

FIGS. 3A and 3B illustrate a flow diagram of an example method 300 for utilizing audio data 114 received from multiple voice-enabled devices 108, and metadata 116 associated with the audio data 114, to determine device clusters 138 for the voice-enabled devices 108.

At 302, the device-clustering component 134 of the remote system 110 may receive audio data 114(1), 114(2), and 114(N) from devices 108(1), 108(2, and 108(N), where N is an integer larger than two. Further, the device-clustering component 134 of the remote system 110 may receive metadata 116(1), 116(2), and 116(N) from devices 108(1), 108(2, and 108(N). at 304, the device-clustering component 134 may store the audio data 114 and the metadata 116 in the audio-data database 304. The data may be stored in a table, such as table 304A, where the metadata, such as the timestamps 130 and SNR data 132 are associated with device IDs 128. At 306, the device-clustering component 134 may create data points with the audio data 114 and the metadata 116 in the audio-data database 126. For instance, the device-clustering component 134 may create a table 306(A) based on the timestamps 130, where, for each timestamp 130, a vector of length equal to the number of voice-enabled devices 108(N) is created. The table 306(A) may be initiated with a value of "−1" for all devices 108. In some examples, if metadata 116 is missing for a voice-enabled device 108, the table 306A may reflect "1" as the value.

At 308, the device-clustering component 134 may normalize the data points and transform the data points into feature vectors. For instance, the device-clustering component 134 may normalize the values in the vectors based on a maximum value at each point in time, or for each of the vectors. Further, the device-clustering component 134 may transform the data into feature vectors to be input into a clustering model. For example, the device-clustering component 134 may represent the data as a two-dimensional matric with each row being a feature vector for one of the voice-enabled devices 108, and the columns are the timestamps 130, as illustrated in table 308A.

At 310, the device-clustering component 134 may determine a number of device clusters 138 to be created for the voice-enabled devices 108. In some examples, the device-clustering component 134 may utilize a number of device clusters 138 based on the number of voice-enabled devices 108. For instance, if a user 104 has ten voice-enabled devices 108, the device-clustering component 134 may set the number of clusters to be two device clusters 138. The determination may be based on training data that indicates numbers of device clusters 138 that would be appropriate for varying numbers of voice-enabled devices 108. For example, users 104 that have two voice-enabled devices 108 may not desire device clusters 138, but users 104 with five voice-enabled devices may desire to have two device clusters 138. In other examples, the device-clustering component 134 may receive input from a user 104, or an operator of the remote system 110, that sets the number of device clusters 138.

In other examples, the device-clustering component 134 may utilize various algorithms or techniques to determine the number of device clusters 138. For example, the device-clustering component 134 may utilize gap statistic estimation to determine how many device clusters 138 are to be created for the group of voice-enabled devices 108(1)-(N). Generally, determining a device cluster consists of grouping data or objects into sets such that the objects within a cluster are as similar as possible, whereas objects from different clusters are dissimilar as possible. Thus, the number of device clusters 138 may be somewhat subjective and dependent on the characteristic used for determining similarities, as well as the level of detail required from the clusters. Thus, gap statistic estimation may be utilized as a more standardized estimate for the optimal number of device clusters 138 into which the voice-enabled devices 108 are to be included. Thus, the device-clustering component 134 may execute an algorithm to determine, using gap statistic estimation techniques, how many device clusters 138 to create for the group of voice-enabled devices 108.

At 312, the device-clustering component 134 may cluster, assign, or otherwise determine which voice-enabled devices 108 are to be included in which of the number of device clusters 138 determined at 310. For instance, the device-clustering component 134 may utilize the number of device clusters 138 determined using gap statistic estimation at 310 as an input into one or more k-means clustering algorithms. The k-clustering algorithm(s) may take, as input, the number of clusters to be create as the "k," and further take the vectors and partition the voice-enabled devices 108 into device clusters 138 based on the timestamp data 130 and/or the SNR data 132. However, in various examples, other types of metadata or information may be utilized in addition to, or as an alternative to, the SNR data 132. For instance, the device-clustering component 134 may utilize signal amplitudes, voice-activity levels, a clarity level, and so forth.

Figure 4A:
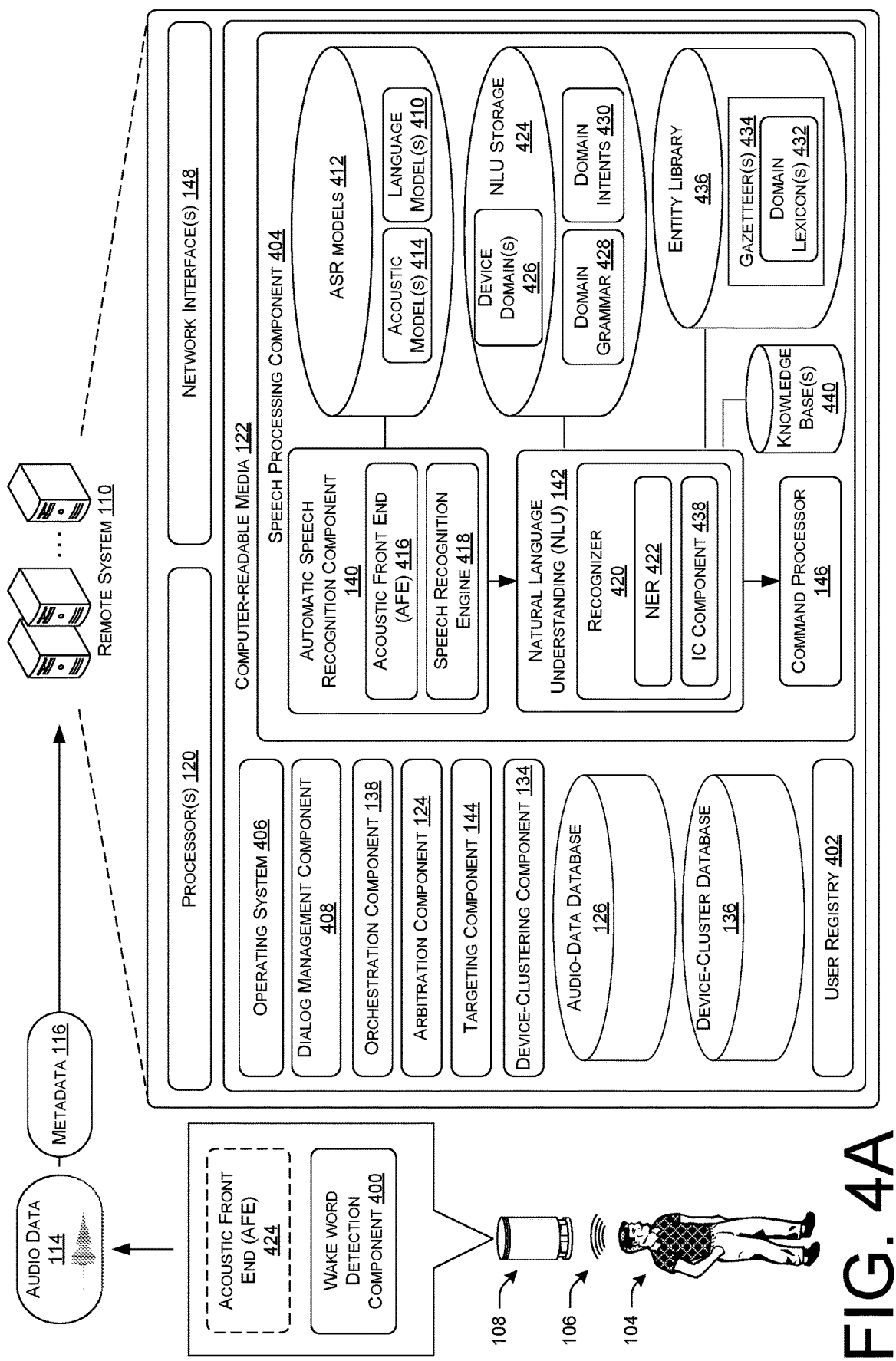
FIG. 4A illustrates a block diagram of an example architecture of a speech processing system which receives audio data and metadata from voice-enabled devices, and performs techniques to determine which of the voice-enabled devices is to respond to a speech utterance of a user represented in the audio signal.

FIG. 4A illustrates a block diagram of an example architecture of a speech processing system (e.g., remote system 110) which receives audio data 114 and metadata 116 from voice-enabled devices 108, and performs techniques to determine which of the voice-enabled devices is to respond to a speech utterance of a user represented in the audio signal.

FIG. 4A illustrates a block diagram of an example architecture of a remote system 110 which receives audio data 114 and metadata 116 from voice-enabled devices 108, and performs processing techniques to determine which of the voice-enabled devices 108 is to respond to a voice command 106 of a user 104 represented in the audio data 114. In some examples, the remote system may determine device clusters 138 according to the techniques described herein, which are utilized to determine which device 108 is to respond to the voice command 106.

FIG. 4A includes a conceptual diagram of how a voice command 106 can be processed, allowing a system to capture and execute commands spoken by a user 104, such as spoken commands that may follow a wakeword. The various components illustrated may be located on a same or different physical devices. Communication between various components illustrated in FIG. 4A may occur directly or across a network 118. An audio capture component, such as a microphone of voice-enabled device 108, captures audio corresponding to a voice command 106. The voice-enabled device 108, using a wakeword detection component 400, then processes the voice command 106, or audio data corresponding to the voice command 106, to determine if a keyword (such as a wakeword) is detected in the voice command 106. Following detection of a wakeword, the voice-enabled device 108 sends an audio data 114 corresponding to the voice command 106, to a computing device of the remote system 110 that includes the ASR component 140. The audio data 114 may be output from an acoustic front end (AFE) 424 located on the voice-enabled device 108 prior to transmission. Or, the audio data 114 may be in a different form for processing by a remote AFE 416, such as the AFE 416 located with the ASR component 140.

In various examples, the remote system 110 may include one or more processors 120 to power components, devices, and actions of the remote system 110, and one or more network interfaces 148 such as a wireless or Wi-Fi network communications interface, an Ethernet communications interface, a cellular network communications interface, a Bluetooth communications interface, etc., for communications by the remote system 110 over various types of networks 118, including wide-area network, local-area networks, private networks, public networks etc. In the case of a wireless communications interfaces, such interfaces may include radio transceivers and associated control circuits and logic for implementing appropriate communication protocols.

The remote system 110 may further include computer-readable media 122 which stores various components, components, or other executable software to perform various arbitration actions to determine which voice-enabled device 108 is to respond to a command in the voice command 106. The computer-readable media 122 may store an operating system 406 that is configured to manage hardware and services within and coupled to the remote system 110.

The computer-readable media 122 may further store a dialog management component 408 that is responsible for conducting speech dialogs with the user 104 in response to meanings or intents of user speech determined by the NLU component 142. The dialog management component 408 may include domain logic that is used to analyze the meaning of user speech and to determine how to respond to the user speech. The dialog management component 408 may define rules and behaviors relating to different information or topic domains, such as news, traffic, weather, to-do lists, shopping lists, music, home automation, retail services, and so forth. The domain logic maps spoken user statements to respective domains and is responsible for determining dialog responses and/or actions to perform in response to user utterances.

The computer-readable media 122 may further include the arbitration component 124, the targeting component 144, and a user registry 402 including device indications for the devices 108 of the user 104. The arbitration component 124 may perform various functions or processes for determining a voice-enabled device 108 to respond to a user 104 based on metadata 116 for voice-enabled devices 108 that generated audio data 114 corresponding to a voice command 106. The targeting component 144 may perform various operations for determining which voice-enabled devices 108 are to respond to a command in the voice command 106. For instance, the targeting component 144 may determine, using the user registry 402, all of the voice-enabled devices 108 and/or secondary devices 112 associated with a user and/or household account. The targeting component 144 may use the metadata 116, intent expressed in the voice command 106 determined by the NLU component 142, and devices states stored in the user registry 402 to determine which of the devices 108 should perform the command indicated in the voice command 106.

The remote system 110 may further include various components for processing a voice command 106, such as automatic speech recognition component 140 and natural language understanding component 142. The various components illustrated may be located on a same or different physical devices.

In some examples, audio data (e.g., audio data 114) may be received by the remote system 110 for speech processing for interpretation of the included voice command 106 (either for purposes of enabling voice-communications and/or for purposes of executing a command in the speech). The audio data may include data corresponding to the wakeword, or the portion of the audio data corresponding to the wakeword may be removed by the voice-enabled device 108 prior to sending. Upon receipt by the remote system 110, the ASR component 140 may convert the audio data into text. The ASR component 140 transcribes audio data into text data representing the words of the speech contained in the audio data. The text data may then be used by other components for various purposes, such as arbitration, executing system commands, inputting data, etc. A voice command 106 in the audio data is input to a processor configured to perform ASR which then interprets the utterance based on the similarity between the utterance and pre-established ASR language models stored in an ASR model knowledge base (ASR Models Storage 412). For example, the ASR process may compare the input audio data with models for sounds (e.g., subword units or phonemes) and sequences of sounds to identify words that match the sequence of sounds spoken in the utterance of the audio data.

The different ways a voice command 106 may be interpreted (i.e., the different hypotheses) may each be assigned an ASR probability or an ASR confidence score representing the likelihood that a particular set of words matches those spoken in the utterance. The ASR confidence score may be based on a number of factors including, for example, the similarity of the sound in the utterance to models for language sounds (e.g., an acoustic model 414 stored in an ASR Models Storage 412), and the likelihood that a particular word which matches the sounds would be included in the sentence at the specific location (e.g., using a language or grammar model). Thus, each potential textual interpretation of the spoken utterance (hypothesis) is associated with an ASR confidence score. Based on the considered factors and the assigned ASR confidence score, the ASR component 140 outputs the most likely text recognized in the audio data. The ASR component 140 may also output multiple ASR hypotheses in the form of a lattice or an N-best list with each hypothesis corresponding to an ASR confidence score or other score (such as probability scores, etc.).

The device or devices performing the ASR processing may include an acoustic front end (AFE) 416 and a speech recognition engine 418. The acoustic front end (AFE) 416 transforms the audio data from the microphone into data for processing by the speech recognition engine 418. The speech recognition engine 418 compares the speech recognition data with acoustic models 414, language models 410, and other data models and information for recognizing the speech conveyed in the audio data. The AFE 416 may reduce noise in the audio data and divide the digitized audio data into frames representing time intervals for which the AFE 416 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE 416 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 418 may process the output from the AFE 416 with reference to information stored in speech/model storage (412). Alternatively, post front-end processed data (such as feature vectors) may be received by the device executing ASR processing from another source besides the internal AFE 416. For example, the voice-enabled device 108 may process audio data into feature vectors (for example using an on-device AFE 416) and transmit that information to a server across a network for ASR processing. Feature vectors may arrive at the remote system 110 encoded, in which case they may be decoded prior to processing by the processor executing the speech recognition engine 418.

The speech recognition engine 418 attempts to match received feature vectors to language phonemes and words as known in the stored acoustic models 414 and language models 410. The speech recognition engine 418 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 418 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 418 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 110, for natural language understanding (NLU) processing, such as conversion of the text into commands for execution, either by the user device, by the remote system 110, or by another device (such as a server running a specific application like a search engine, etc.).

The NLU component 142 (e.g., server) may include various components, including potentially dedicated processor(s), memory, storage, etc. As shown in FIG. 4A, the NLU component 142 may include a recognizer 420 that includes a named entity recognition (NER) component 422 which is used to identify portions of query text that correspond to a named entity that may be recognizable by the system. A downstream process called named entity resolution links a text portion to a specific entity known to the system. To perform named entity resolution, the system may utilize gazetteer information 434 stored in entity library storage 436. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU component 142 takes textual input (such as the textual input determined by the ASR component 140) and attempts to make a semantic interpretation of the text. That is, the NLU component 142 determines the meaning behind the text based on the individual words and then implements that meaning. NLU component 142 interprets a text string to derive an intent or a desired action from the user as well as the pertinent pieces of information in the text that allow a device (e.g., voice-enabled device 108) to complete that action. For example, if a spoken utterance is processed using ASR component 140 and outputs the text "turn off the alarm" the NLU component 142 may determine that the user 104 intended that the voice-enabled device 108(2) be instructed to turn off an alarm sound being output. As another example, if the spoken utterance is processed using ASR component 140 and outputs the text "hang up the phone" the NLU component 142 may determine that the user 104 intended that the voice-enabled device 108(2) be instructed to hang up a phone through which a phone call is being performed.

The NLU component 142 may process several textual inputs related to the same utterance. For example, if the ASR component 140 outputs N text segments (as part of an N-best list), the NLU component 142 may process all N outputs to obtain NLU results.

To correctly perform NLU processing of speech input, the NLU component 142 may be configured to determine a "domain" of the utterance so as to determine and narrow down which services offered by the endpoint device (e.g., remote system 110 or the voice-enabled device 108) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 422 receives a query in the form of ASR results and attempts to identify relevant grammars and lexical information that may be used to construe meaning. To do so, the NLU component 142 may begin by identifying potential domains that may relate to the received query. The NLU storage 424 includes a database of devices domains 426 which identify domains associated with specific devices. For example, the voice-enabled device 108 may be associated with domains for music, telephony, calendaring, contact lists, and device-specific communications, but not video. In addition, the device domains 426 may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 420, language model and/or grammar databases 428, a particular set of domain intents/actions 430, and a particular personalized domain lexicon 432. Each gazetteer 434 may include domain-indexed lexical information associated with a particular user and/or device. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains is ordinarily selected to be the correct result.

An intent classification (IC) component 438 parses the query to determine an intent or intents for each identified domain, where the intent corresponds to the action to be performed that is responsive to the query. Each domain is associated with a database (e.g., domain intents 430) of words linked to intents. For example, a music domain intent database 430 may link words and phrases such as "quiet," "volume off," and "mute" to a "mute" intent. A voice-message domain intent database, meanwhile, may link words and phrases such as "send a message," "send a voice message," "send the following," or the like. The IC component 438 identifies potential intents for each identified domain by comparing words in the query to the words and phrases in the domain intents database 430. In some instances, the determination of an intent by the IC component 438 is performed using a set of rules or templates that are processed against the incoming text to identify a matching intent.

In order to generate a particular interpreted response, the NER 422 applies the grammar models and lexical information associated with the respective domain to actually recognize a mention one or more entities in the text of the query. In this manner, the NER component 422 identifies "slots" (i.e., particular words in query text) that may be needed for later command processing. Depending on the complexity of the NER component 422, it may also label each slot with a type of varying levels of specificity (such as noun, place, city, artist name, song name, or the like). Each grammar model 428 includes the names of entities (i.e., nouns) commonly found in speech about the particular domain (i.e., generic terms), whereas the lexical information 432 from the gazetteer 434 is personalized to the user(s) and/or the device. For instance, a grammar model associated with the shopping domain may include a database of words commonly used when people discuss shopping.

The intents identified by the IC component 438 are linked to domain-specific grammar frameworks (included in 430) with "slots" or "fields" to be filled. Each slot/field corresponds to a portion of the query text that the system believes corresponds to an entity. To make resolution more flexible, these frameworks would ordinarily not be structured as sentences, but rather based on associating slots with grammatical tags. For example, if "send a message" is an identified intent, a grammar (428) framework or frameworks may correspond to sentence structures such as "Send a message to {contact}," "Send a voice message to {contact}," "Send the following to {contact}," etc.

For example, the NER component 422 may parse the query to identify words as subject, object, verb, preposition, etc., based on grammar rules and/or models, prior to recognizing named entities. The identified verb may be used by the IC component 438 to identify intent, which is then used by the NER component 422 to identify frameworks. A framework for the intent of "send a message," meanwhile, may specify a list of slots/fields applicable to play the identified "contact" and any object modifier (e.g., specifying a device of the recipient) or the like. The NER component 422 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 422 may search the database of generic words associated with the domain (in the knowledge base 440). So, for instance, if the query was "send message to Joe," after failing to determine a last name for "Joe," the NER component 422 may search the domain vocabulary for the word "Joe." In the alternative, generic words may be checked before the gazetteer information, or both may be tried, potentially producing two different results.

The output data from the NLU component 142 (which may include tagged text, commands, etc.) may then be sent to the command processor 146. The destination command processor 146 may be determined based on the NLU output. For example, if the NLU output includes a command to send a message, the destination command processor 146 may be a message sending application, such as one located on the user device or in a message sending appliance, configured to execute a message sending command. If the NLU output includes a search request, the destination command processor 146 may include a search engine processor, such as one located on a search server, configured to execute a search command.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 142 during runtime operations where NLU operations are performed on text (such as text output from an ASR component 1003). Each domain may have specially configured components to perform various steps of the NLU operations.

For example, in an NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 420. Each recognizer may include various NLU components such as an NER component 422, IC component 438 and other components such as an entity resolver, or other components.

As noted above, multiple devices may be employed in a single remote system 110. In such a multi-device system, each of the devices may include different components for performing different aspects of the speech processing. The multiple devices may include overlapping components. The components of the voice-enabled device 108 and the remote system 110, as illustrated herein are exemplary, and may be located in a stand-alone device or may be included, in whole or in part, as a component of a larger device or system, may be distributed across a network or multiple devices connected by a network, etc.

Figure 4B:
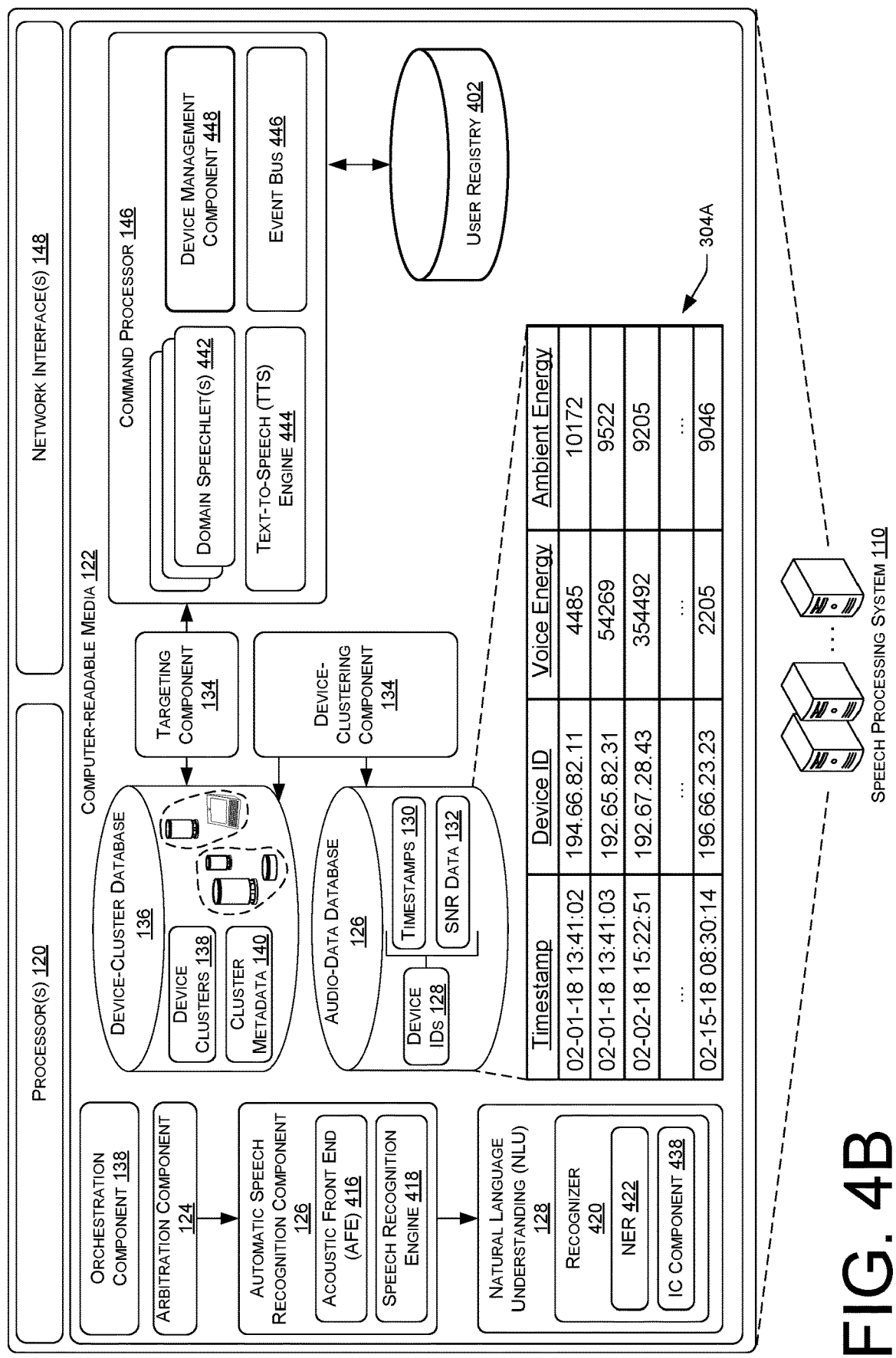
FIG. 4B illustrates a block diagram of an example architecture of a speech processing system including a command processor configured to make a decision as to which voice-enabled device is to respond to a speech utterance of a user.

FIG. 4B illustrates a block diagram of an example architecture of the remote system 110 including the command processor 146 configured to generate a command that the selected voice-enabled device 108 uses to respond to the voice command 106. As illustrated in FIG. 4B, the speech system 110, including the orchestration component 138, the ASR component 140, and the NLU component 142, may be coupled to the targeting component 144 and provide the targeting component with the intent determined to be expressed in the voice command 106. Further, the arbitration component 124 may provide device indicators (e.g., IP addresses, devices names, etc.) for one or more of the voice-enabled devices 108. The targeting component 144 may then perform techniques to determine a target device (e.g., a device to perform the requested operation), and provide various data to the command processor 146. For instance, the targeting component 144 may provide the command processor 146 with various device identifiers of the voice-enabled devices 108, the determined target device, the determined intent and/or command, etc.

The command processor 146 and/or NLU component 142 may determine a domain based on the intent and, based on this determination, route the request corresponding to the audio data to the appropriate domain speechlet, such as the illustrated domain speechlets 442. The domain speechlet 442 may comprise any type of device or group of devices (e.g., hardware device, virtual devices or partitions, server, etc.), and may receive the text data and/or an intent associated with the audio data 114 and determines how to respond to the request. For instance, the intent for a command "please hang up my phone call" may be routed to a smart home domain speechlet 442 which controls devices connected to the voice-enabled devices 108, such as a phone through which a phone call is being conducted. The smart home domain speechlet 442 may determine a command to generate based on the intent of the user 104 to hang up a phone call. Additionally, the smart home domain speechlet 442 may determine additional content, such as audio data, to be output by one of the voice-enabled devices 108(1) or 108(2), such as "we have hung up your phone call."

Various types of domain speechlets 442 may be used to determine which devices 108 to use to respond to a voice command 106, as well as the appropriate response 148 and potential additional content (e.g., audio data). For example, the domain speechlets 442 may include a third party skills domain speechlet 442 which may handle intents associated with gaming, productivity, etc., a music domain speechlet 442 which may handle intents associated with music play requests (e.g., Amazon Music, Pandora, Spotify, iHeart, etc.), a video domain speechlet 442 which may handle intents associated with video play requests (e.g., Amazon Video, HBO, Netflix, Hulu, etc.), a household organization domain speechlet 442 which may handle intents associated with household activities (e.g., calendars, reminders, timers, etc.), a smart home domain speechlet 442 which may handle intents associated with controlling smart devices (e.g., controlling lights, door locks, home monitoring, etc.), an automotive domain speechlet 442, a shopping domain speechlet 442 which may handle shopping requests (e.g., making a shopping list, ordering items online, etc.), and/or a weather domain speechlet 442 which may handle requests for weather forecasts (e.g., providing a URL to a weather website, providing weather related images and/or videos, etc.).

After the domain speechlet 442 generates the appropriate command based on the intent of the user 104, and/or provides additional content, such as audio data, to be output by one of the voice-enabled devices 108 (e.g., "we have hung up your phone call"), the domain speechlet 442 may provide this information back to the speech system 110, which in turns provides some or all of this information to a text-to-speech (TTS) engine 444. The TTS engine 444 then generates an actual audio file for outputting the second audio data determined by the domain speechlet 442 (e.g., "we have hung up your phone call", or "we have turned off your alarm . . . "). After generating the file (or "audio data"), the TTS engine 444 may provide this data back to the speech system 110.

The speech system 110 may then publish (i.e., write) some or all of this information to an event bus 446. That is, the speech system 110 may provide information regarding the initial request (e.g., the speech, the text, the domain/intent, etc.), the response to be provided to the voice-enabled device 108 (e.g., the command to hang up a phone call, the command to turn off an alarm, etc.), or any other information pertinent to the interaction between the voice-enabled device 108(1) and the remote system 110 to the event bus 446.

Within the remote system 110, one or more components or services may subscribe to the event bus 446 so as to receive information regarding interactions between user devices and the remote system 110. In the illustrated example, for instance, the device management component 448 may subscribe to the event bus 446 and, thus, may monitor information regarding these interactions. In some examples, monitoring information in the event bus 446 may comprise communications between various components of the remote system 110. For example, the targeting component 144 may monitor the event bus 446 to identify device state data for voice-enabled devices 108. In some examples, the event bus 446 may "push" or send indications of events and/or device state data to the targeting component. Additionally, or alternatively, the event bus 446 may be "pulled" where the targeting component 144 sends requests to the event bus 446 to provide an indication of device state data for a voice-enabled device 108. The event bus 446 may store indications of the device states for the devices 108, such as in a database (e.g., user registry 402), and using the stored indications of the device states, send the device state data for voice-enabled devices 108 to the targeting component. Thus, to identify device state data for a device 108 and/or 112, the targeting component 144 may send a request to the event bus 446 (e.g., event component) to provide an indication of the device state data associated with a device 108 and/or 112, and receive, from the event bus 446, the device state data that was requested.

The device management component 448 functions to monitor information published to the event bus 446 and identify events that may trigger action. For instance, the device management component 448 may identify (e.g., via filtering) those events that: (i) come from voice-enabled devices 108 that are associated with secondary device(s) 112 (e.g., have secondary devices 112 in their environments such as televisions, personal computing devices, etc.), and (ii) are associated with supplemental content (e.g., image data, video data, etc.). The dev device management component 448 may reference the user registry 402 to determine which voice-enabled devices 108 are associated with secondary devices 112, as well as determine device types, states, and other capabilities of these secondary devices 112. For instance, the device management component 448 may determine, from the information published to the event bus 446, an identifier associated with the voice-enabled device 108 making the corresponding request or the voice-enabled device 108 selected to respond to the voice command 106. The device management component 448 may use this identifier to identify, from the user registry 402, a user account associated with the voice-enabled device 108. The device management component 448 may also determine whether any secondary devices 112 have been registered with the identified user account, as well as capabilities of any such secondary devices 112, such as how the secondary devices 112 are configured to communicate (e.g., via WiFi, short-range wireless connections, etc.), the type of content the devices 112 are able to output (e.g., audio, video, still images, flashing lights, etc.), and the like.

The device management component 448 may determine whether a particular event identified is associated with supplemental content. That is, the device management component 448 may write, to a datastore, indications of which types of events and/or which primary content or responses are associated with supplemental content. In some instances, the remote system 110 may provide access to third-party developers to allow the developers to register supplemental content for output on secondary devices for particular events and/or primary content. For example, if a voice-enabled device 108 is to output that the weather will include thunder and lightning, the device management component 448 may store an indication of supplemental content such as thunder sounds, pictures/animations of lightning and the like. In another example, if a voice-enabled device 108 is outputting information about a particular fact (e.g., "a blue whale is the largest mammal on earth . . . "), then a secondary device 112, such as television, may be configured to provide supplemental content such as a video or picture of a blue whale. In these and other examples, the device management component 448 may store an association between the primary response or content (e.g., outputting of information regarding the world's largest mammal) and corresponding supplemental content (e.g., the audio data, image data, or the like). In some instances, the device management component 448 can also indicate which types of secondary devices are to output which supplemental content. For instance, in the instant example, the device management component 448 may store an indication that secondary devices 112 of a class type "tablet" are to output a picture of a blue whale. In these and other instances, meanwhile, the device management component 448 may store the supplemental content in association with secondary-device capabilities (e.g., devices with speakers output the audio commentary, devices with screens output the image, etc.).

Finally, the device management component 448 may determine how to transmit response and/or supplement content (and/or information acquiring the content) to the voice-enabled devices 108 and/or the secondary devices 112. To make this determination, the device management component 448 may determine a device type of the voice-enabled devices 108 and/or secondary devices 112, capabilities of the device(s), or the like, potentially as stored in the user registry 402. In some instances, the device management component 448 may determine that a particular device is able to communicate directly with the remote system 110 (e.g., over WiFi) and, thus, the device management component 448 may provide the response and/or content directly over a network 118 to the secondary device 112 (potentially via the speech system 110). In another example, the device management component 448 may determine that a particular secondary device 112 is unable to communicate directly with the remote system 110, but instead is configured to communicate with a voice-enabled device 108 in its environment over short-range wireless networks. As such, the device management component 448 may provide the supplement content (or information) to the speech system 110, which in turn may send this to the voice-enabled device 108, which may send the information over a short-range network to the secondary device 112.

The computer-readable media 122 may further include the user registry 402 that includes data regarding user profiles as described herein. The user registry 402 may be located part of, or proximate to, the remote system 110, or may otherwise be in communication with various components, for example over the network 118. The user registry 402 may include a variety of information related to individual users, accounts, etc. that interact with the voice-enabled devices 108, and the remote system 110. For illustration, the user registry 402 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry 402 may store indications of associations between various voice-enabled devices 108 and/or secondary device 112, such as virtual clusters of devices. The user registry 402 may represent clusters of devices 108 and/or 112 as single devices that can receive commands and disperse the commands to each device 108 and/or 112 in the cluster. In some examples, the virtual cluster of devices may be represented as a single device which is determined as being capable, or not capable (e.g., offline), of performing a command in a speech utterance. A virtual cluster of devices may generally correspond to a stored grouping of devices, or a stored association between a group of devices.

In some examples, the device state for devices associated with a user account may indicate a current state of the device, such as voice-enabled devices 108(1) and 108(2). In this way, the command processor 146 and/or the domain speechlets 442 may determine, based on the stored device states in the user registry 402, a current device state of the voice-enabled devices 108. Rather than receiving device states for the voice-enabled devices 108, in metadata 116, the devices states may already have been determined or received and stored in the user registry 402. Further, the user registry 402 may provide indications of various permission levels depending on the user. As an example, the speech system 110 may perform speaker recognition on the audio signals 114 to determine an identity of the speaker. If the speaker is a child for instance, the child profile may have permission restrictions where they are unable to hang up a phone call of a parent, for example. Conversely, a parent profile may be able to hang up a phone call involving a child profile, or change channel on a television when a child profile is also detected as watching the television.

In some examples, to determine the device state, the event bus 446 may publish different events which indicate device states to various entities or components that subscribe to the event bus 446. For instance, if an event of "set an alarm" occurs for a voice-enabled device 108, the event bus 446 may publish the indication of this event, and thus the device state of an alarm is set for the voice-enabled device 108. Thus, various components, such as the targeting component 144, may be provided with indications of the various device states via the event bus 446. The event bus 446 may further store and/or update device states for the voice-enabled devices 108 in the user registry 402. The components of the remote system 110 may query the user registry 402 to determine device states.

A particular user profile may include a variety of data that may be used by the system 110. For example, a user profile may include information about what voice-enabled device 108 are associated with the user 104. The user profile may further indicate an IP address for each of the devices associated with the user 104, user IDs for each of the devices, indicates of the types of devices, and current device states for the devices.

Figure 5:
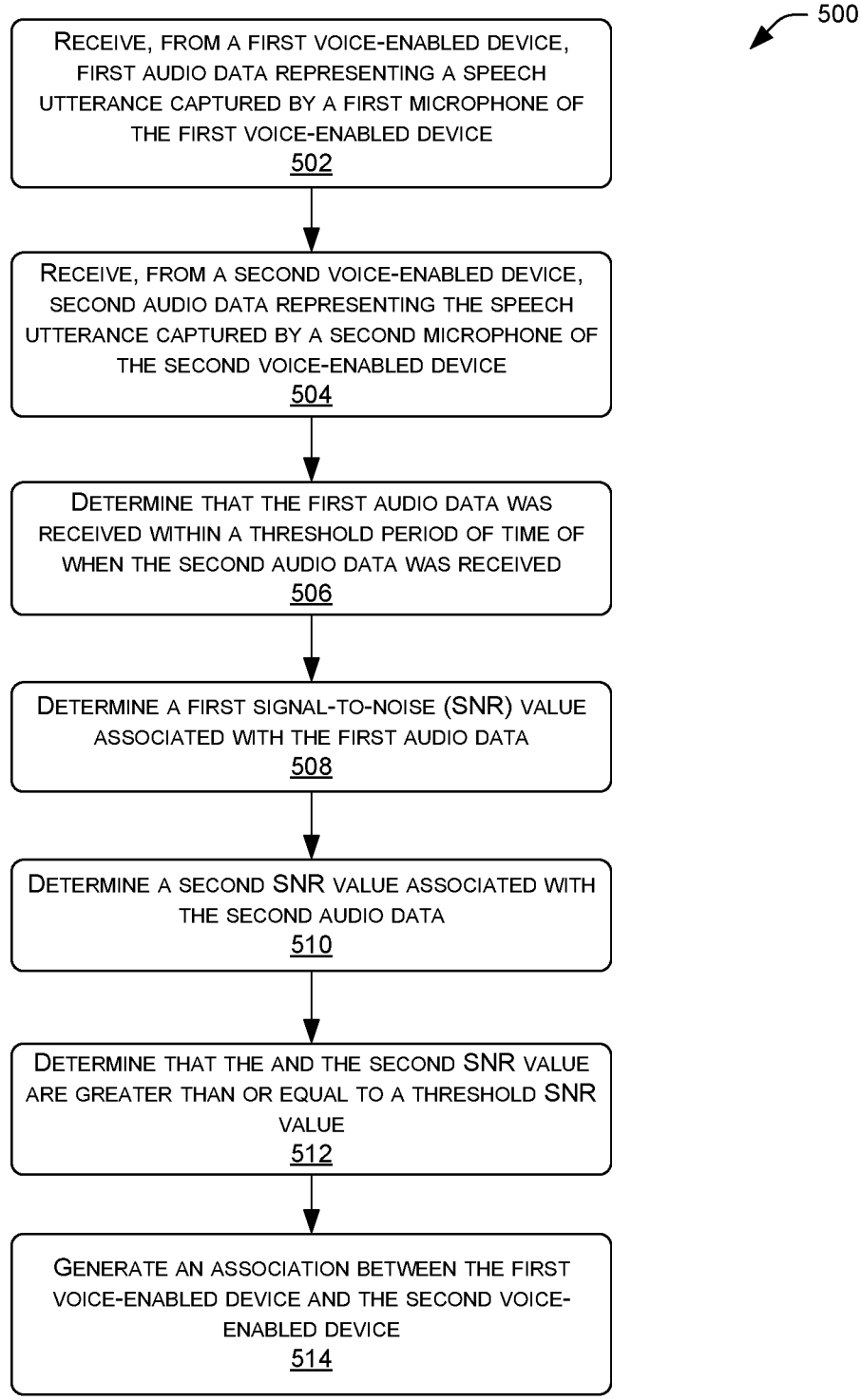
FIG. 5 illustrates a flow diagram of an example method for determining that two voice-enabled devices belong in a same device cluster.
Figure 6:
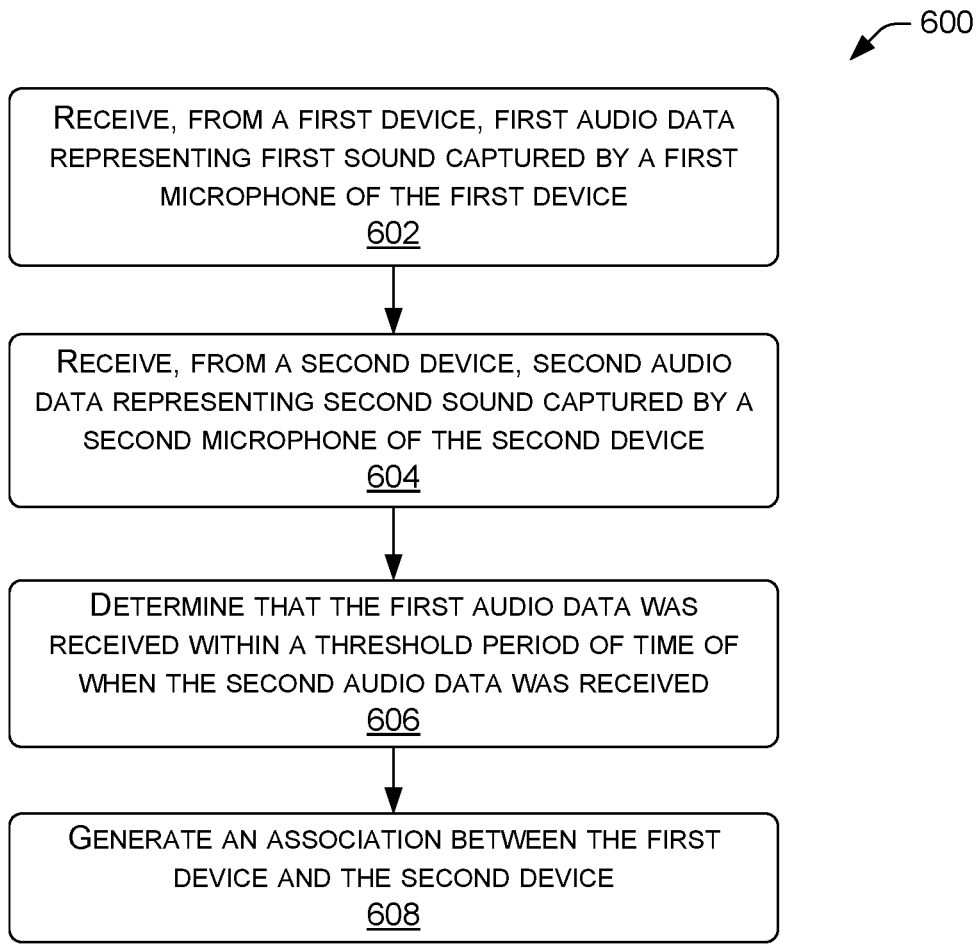
FIG. 6 illustrates a flow diagram of another example method for determining that two voice-enabled devices belong in a same device cluster.
Figure 7:
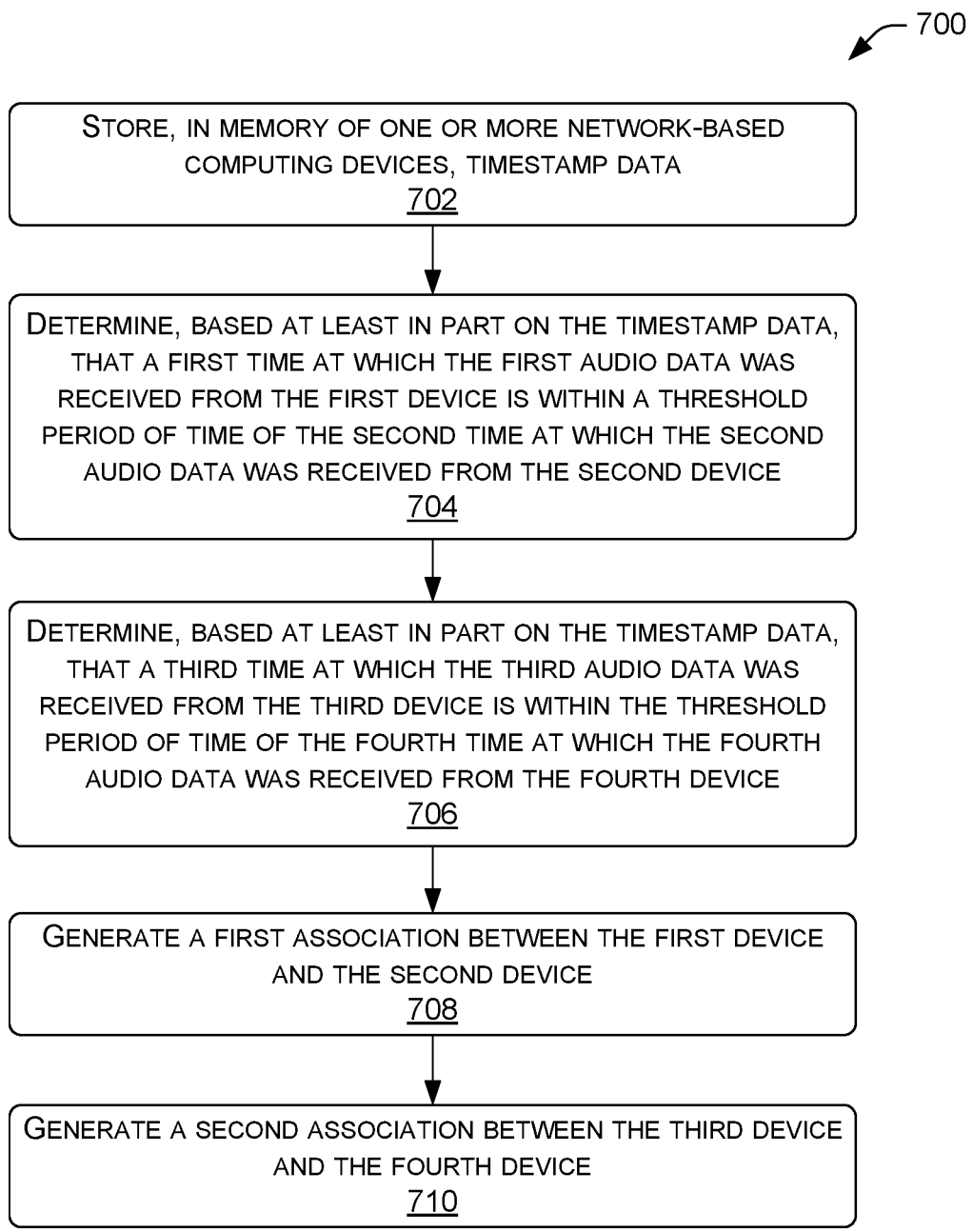
FIG. 7 illustrates a flow diagram of an example method for determining to create multiple device clusters to associate multiple voice-enabled devices.

FIGS. 5, 6, and 7 illustrate flow diagrams of example methods 500, 600, and 700 for creating device clusters 138 for grouping multiple voice-enabled devices 108 that detect voice commands 106 of a user 104. These methods are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 5 illustrates a flow diagram of an example method 500 for determining that two voice-enabled devices 108 belong in a same device cluster 138.

At 502, a remote system 110 may receive, from a first voice-enabled device 108, first audio data 114 representing a speech utterance (e.g., voice command 106) captured by a first microphone of the first voice-enabled device 108. At 504, the remote system 110 may receive, from a second voice-enabled device 108, second audio data 114 representing the speech utterance captured by a second microphone of the second voice-enabled device 108.

In some examples, a device (e.g., an accessory device) other than the first voice-enabled device 108 and the second voice-enabled device 108 may capture the speech, and/or other sound. For example, a headset of the user 104, a microphone in an automobile of the user 104, or other microphones in an environment including the voice-enabled devices 108 may capture the sound and/or speech utterance. One or both of the voice-enabled devices 108 may receive their audio data from a microphone of the other device, and send the audio data 114 to the remote system 110.

At 506, the device-clustering component 134 may determine that the first audio data 114 was received within a threshold period of time of when the second audio data 114 was received. In some examples, the device-clustering component 134 may identify a first timestamp 130, or multiple first timestamps 130 associated with the first voice-enabled device 108, wherein each first timestamp 130 indicates a corresponding time at which audio data 114 was received from the first voice-enabled device 108. Further, the device-clustering component 134 may identify a second timestamp 130, or multiple second timestamps 130, associated with the second voice-enabled device 108, wherein each second timestamp 130 indicates a corresponding time at which audio data 114 was received from the second voice-enabled device 108.

At 508, the device-clustering component 134 may determine a first signal-to-noise (SNR) value 132 associated with the first audio data 114. In some examples, the device-clustering component 134 may identify, for a number of instances where audio data 114 was received from the first voice-enabled device within the threshold period of time of audio data 114 being received from the second voice-enabled device 108, first SNR values 132 associated with the first voice-enabled device 108, wherein each first SNR value 132 is associated with corresponding audio data 114 received from the first voice-enabled device 108 in the number of instances.

At 510, the device-clustering component 134 may determine a second SNR value 132 associated with the second audio data 114. In some examples, the device-clustering component 134 may identify second SNR values 132 associated with the second voice-enabled device 108, wherein each second SNR value 132 is associated with corresponding audio data 114 received from the second voice-enabled device 108 in the number of instances.

At 512, the device-clustering component 134 may determine that the first SNR value and the second SRN value are greater than a threshold SNR value. In further examples, the device-clustering component 134 may determining that, for more than a threshold number of the number of instances, respective ones of the first SNR values and respective ones of the second SNR values are greater than or equal to the threshold SNR value.

At 514, the device-clustering component 134 may, based at least in part on the first audio data 114 being received within the threshold period of time of when the second audio data 114 was received and at least in part on the first SNR value 132 and the second SNR value 132 being greater than or equal to the threshold SNR value, generate an association between the first voice-enabled device 108 and the second voice-enabled device 108. In various examples, the generating the association (e.g., device cluster 138) may further be based at least in part on the determining that, for more than the threshold number of the number of instances, the respective ones of the first SNR values 132 and the respective ones of the second SNR values 132 are greater than or equal to the threshold SNR value. Even further, the generating the association 138 may be based at least in part on the determining that the audio data 114 was received from the first voice-enabled device 108 within the threshold period of time of when audio data 114 was received from the second voice-enabled device 108 more than the threshold number of instances.

In some examples, the remote system 110 may store the association to be used in future processing of audio data received from the first voice-enabled device. For example, the remote system may receive, from only the first voice-enabled device, third audio data representing a second speech utterance and determine, using natural language processing and the third audio data, that the second speech utterance includes a request to perform an action. For instance, the remote system 110 may determine that the user 102 asked to "Play a movie." However, the voice-enabled device 108(3) may have detected the speech utterance and does not have a display. The remote system may determine, based on the association between the first voice-enabled device 108(3) and the second voice-enabled device 108(1), that the second voice-enabled device 108(1) is to perform the action. Stated otherwise, because the second voice-enabled device 108(3) has the capability (e.g., is communicatively coupled to a television 112(1)) to play a movie, and because the first voice-enabled device 108(1) is in a device cluster 138 with the second voice-enabled device 108(3), the remote system 110 may determine that the second voice-enabled device 108(3) is to perform the action of playing a movie. Thus, the remote system 110 may send data to the second voice-enabled device 108(3) to cause the second voice-enabled device to perform the action of playing a movie.

FIG. 6 illustrates a flow diagram of another example method 600 for determining that two voice-enabled devices 108 belong in a same device cluster 138.

At 602, a remote system 110 may receive, from a first device 108, first audio data 114 representing first sound captured by a first microphone of the first device 108. At 604, the remote system 110 may receive, from a second device 108, second audio data 114 representing second sound captured by a second microphone of the second device 108.

At 606, the device-clustering component 134 may determine that the first audio data was received within a threshold period of time of when the second audio data was received. At 608, the device-clustering component 134 may generate an association (e.g., device cluster 138) between the first device and the second device.

In some examples, the device-clustering component 134 determine a number of instances where audio data 114 was received from the first device 108 within the threshold period of time of when audio data 114 was received from the second device 108. The device-clustering component 134 may determine that the number of instances is greater than or equal to a threshold number of instances (e.g., 5, 10, 100, etc.). In such examples, the device-clustering component 134 may generate the association between the first device 108 and the second device 108 based at least in part on the number of instances being greater than or equal to the threshold number of instances.

In some examples, the device-clustering component 134 may further identify a first signal-to-noise (SNR) value 132 associated with the first audio data 114, identify a second SNR value 132 associated with the second audio data 114, and determine that the first SNR value 132 is within a threshold amount to the second SNR value 132. In such examples, the generating the association between the first device 108 and the second device 108 is further based at least in part on the first SNR value 132 and the second SNR value 132 being greater than or equal to the threshold SNR value. However, the value need not always be an ANR value 132, and could be other audio-signal metrics (e.g., energy levels for voice, energy levels for noise, voice-activity-levels, etc.). For instance, the device-clustering component 134 may identify a first audio-signal metric associated with the first audio data 114, identify a second audio-signal metric associated with the second audio data 114, and determine that the first audio-signal metric is within a threshold amount to the second audio-signal metric.

In some examples, the device-clustering component 134 may determine to add a device 108 to the device cluster 138 that is generated for the first device 108 and the second device 108. For instance, the remote system 110 may, subsequent to the generating the first association between the first device and the second device, receive, from a third device 108, third audio data 114 representing third sound captured by a third microphone of the third device 114. The remote system 110 may further receive, from at least one of the first device 108 or the second device 108, fourth audio 114 data representing fourth sound. The device-clustering component 134 may determine that the third audio data 114 was received within the threshold period of time of when the fourth audio data 114 was received, and generate a second association (e.g., device cluster 138) between the first device 108, the second device 108, and the third device 108.

In some examples, the device-clustering component 134 may determine to remote a device 108 from the device cluster 138. For instance, the device-clustering component 134 may store, in memory 122 of a network-based computing device (e.g., remote system 110), an initial association (e.g., initial device cluster 138) between the first device 108, the second device 108, and a third device 108. The device-clustering component 134 may determine that third audio data 114 was not received from the third device 108 within the threshold period of time from when at least one of the first audio data 114 or the second audio data 114 was received, and based at least in part on the third audio data 114 not being received from the third device 108 within the threshold period of time from when at least one of the first audio data 114 or the second audio 114 data was received, removing the initial association from the memory 122 of the network-based computing device 110.

In some examples, the device-clustering component 134 may store, in memory (e.g., device-cluster database 136) of one or more network-based computing devices 110, the association (e.g., device cluster 138) between the first device 108 and the second device 108. For instance, the device-clustering component 134 may store, in the memory, the association to be used in future processing of audio data received from only the first device. The device-clustering component 134 may determine metadata 140 for the association 138 between the first device 108 and the second device 108, where the metadata 140 includes or indicates at least one of a device name assigned to the first device 108 (e.g., "kitchen device"), an action previously performed by the first device (e.g., turn on the oven), or an identity of a user that issued a voice command 106 represented by the first audio data 114. The device-clustering component 134 may store the metadata 140 in the memory 122 of the one or more network-based computing devices 110.

FIG. 7 illustrates a flow diagram of an example method 700 for determining to create multiple device clusters 138 to associate multiple voice-enabled devices 108. At 702, the device-clustering component 134 may store, in memory 122 of one or more network-based computing devices 110, timestamp data 130 indicating a first time at which first audio data 114 was received from a first device 108, a second time at which second audio data 114 was received from a second device 108, a third time at which third audio data 114 was received from a third device 108, and a fourth time at which fourth audio data 114 was received from a fourth device 108.

At 704, the device-clustering component 134 may determine, based at least in part on the timestamp data 130, that the first time at which the first audio data 114 was received from the first device 108 is within a threshold period of time of the second time at which the second audio data 114 was received from the second device 108. Further, at 706, the device-clustering component 134 may determine, based at least in part on the timestamp data 130, that the third time at which the third audio data 114 was received from the third device 108 is within the threshold period of time of the fourth time at which the fourth audio data 114 was received from the fourth device 108.

At 708, the device-clustering component 134 may generate and/or store, in the memory 122 of one or more network-based computing devices 110, a first association 138 between the first device 108 and the second device 108. At 710, device-clustering component 134 may generate and/or store, in the memory 122 of one or more network-based computing devices 110, a second association 138 between the third device 108 and the fourth device 108.

In various examples, the device-clustering component 134 may identify a set of instances where audio data was received from at least two of the first device, the second device, the third device, or the fourth device, and analyze the set of instances using gap statistic estimation to determine a number of associations between the first device, the second device, the third device, and the fourth device, wherein the number of associations includes the first association and the second association. Further, the device-clustering component 134 may analyze the set of instances using a k-means clustering algorithm, wherein the number of associations determined using the gap statistic estimation is utilized as a number of clusters into which the k-means clustering algorithm is to partition the set of instances.

Figure 8:
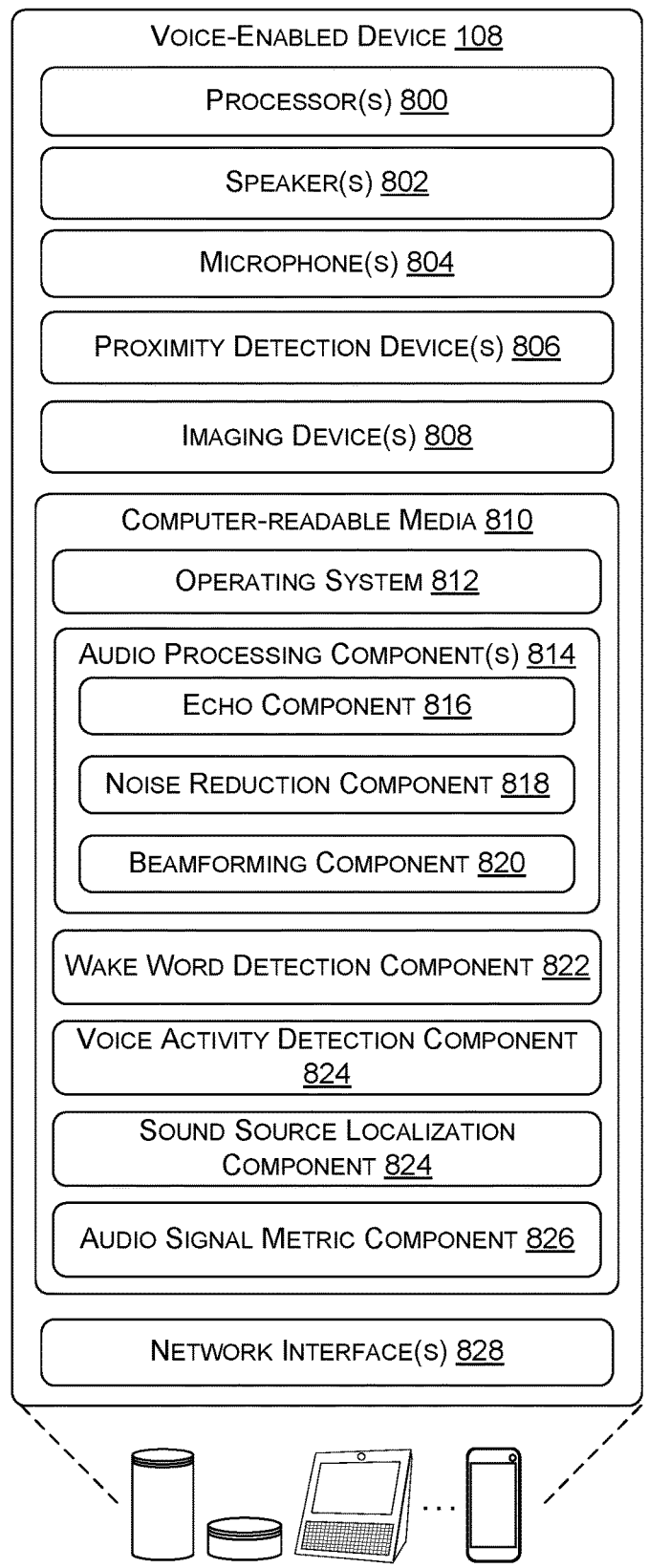
FIG. 8 illustrates a block diagram of an example architecture of a voice-enabled device that generates audio data and metadata, and sends the audio data and metadata to a remote system.

FIG. 8 illustrates a block diagram of an example architecture of a voice-enabled device 108 that generates audio data 114 and metadata 116, and sends the audio data 114 and metadata 116 to a remote system 110.

The voice-enabled device includes one or more processors 800, one or more speakers 802, and one or more microphones 804. The processors 800 may include a central processing unit (CPU), a graphics processing unit (GPU), a microprocessor, a digital signal processor, and so on. Although not illustrated, the voice-enabled device 108 may also include one or more input/output devices (e.g., mouse, keyboard, etc.), one or more displays (e.g., touch screen, Liquid-crystal Display (LCD), Light-emitting Diode (LED) display, organic LED display, plasma display, electronic paper display, etc.), one or more sensors (e.g., accelerometer, magnetometer, etc.), one or more lights, and so on. Any number of components of the voice-enabled device 108 may be used to receive input from a user and/or to output a response.

Although the voice-enabled device 108 is illustrated as having one or more integral speakers 802, in other embodiments the voice-enabled device 108 may not include speakers 802. For example, the voice-enabled device 108 may comprise a microphone device into which a user speaks to issue commands or may comprise a device for connection to another appliance such as a television. Instead of integrated speakers 802, embodiments such as this may use loudspeaker capabilities of other devices, including other voice-enabled devices that do have loudspeakers and different types of dedicated loudspeaker components. As one example, the voice-enabled device 108 may produce an audio output signal that drives an external loudspeaker. As another example, the voice-enabled device 108 may drive or control an external loudspeaker through a wireless data connection such as a Bluetooth connection. In other situations, the voice-enabled device 108 may be used in conjunction with a loudspeaker device that receives audio signals and other instructions from the speech processing system 110, rather than from the voice-enabled device 108.

The microphones 804 may include sensors (e.g., transducers) configured to receive sound. The microphones 804 may generate input signals for audio input (e.g., sound). For example, the microphones 804 may determine digital input signals for an utterance of a user. In some instances, the microphones 804 are implemented in an array. The array may be arranged in a geometric pattern, such as a linear geometric form, circular geometric form, or any other configuration. For example, for a given point, an array of four sensors may be placed in a circular pattern at 90 degree increments (e.g., 0, 90, 180, 270) to receive sound from four directions. The microphones 804 may be in a planar configuration, or positioned apart in a non-planar three-dimensional region. In some implementations, the microphones 804 may include a spatially disparate array of sensors in data communication. For example, a networked array of sensors may be included. The microphones 804 may include omni-directional microphones, directional microphones (e.g., shotgun microphones), and so on.

In some examples, the microphones 804 and the speakers 802 facilitate interactions, such as dialogue, with user 104. The microphones 804 produce audio signals representing sound from the environment of the voice-enabled device 108, such as voice commands 106 by the user 104. The audio signals produced by the microphones 804 may comprise directional audio signals or may be used to produce directional audio signals, where each of the directional audio signals emphasizes audio from a different radial direction relative to the microphones 804.

The processors 800 of the voice-enabled device 108 may be coupled to the components of the voice-enabled device 108 to cause the voice-enabled device 108 to perform various actions or operations. In some examples, the voice-enabled device 108 may include one or more proximity detection devices 806, such as a camera, a ranging device, or other sensor that is used to determine the portion of the user 104 relative to the voice-enabled device 108, and generate corresponding proximity or distance data. This proximity or distance data may be used as metadata for purposes of arbitration.

The voice-enabled device 108 may also include imaging devices 808 which take images of the environment 102 of the user 104. For instance, upon detecting a wakeword or other wake event, the voice-enabled device 108 may collect image data using the imaging devices 808. The imaging devices may include a camera, thermal imaging device, or any other type of imaging device 808 to capture images of the environment 102. The imaging devices 808 may generate image data, which in turn may be used as metadata for purposes of arbitration.

The voice-enabled device 108 may include computer-readable media 810. The computer-readable media 810 may be used to store any number of software components that are executable by the processors 800. Software components stored in the computer-readable media 810 may include an operating system 812 that is configured to manage hardware and services within and coupled to the voice-enabled device 108. In addition, executable components stored by the computer-readable media 810 may include audio processing components 814 configured to produce an audio signal using the microphones 804. The audio processing components 814 may include functionality for processing microphone audio signals generated by the microphones 804 and/or output audio signals provided to the speakers 802. As an example, the audio processing components 814 may include an acoustic echo cancellation or suppression component 816 for reducing acoustic echo generated by acoustic coupling between the microphones 804 and the speaker 802. The audio processing components 814 may also include a noise reduction component 818 for reducing noise in received audio signals, such as elements of microphone audio signals other than user speech.

The audio processing components 814 may include one or more audio beamformers or beamforming components 820 configured to generate directional audio signals that are focused in different directions. More specifically, the beamforming components 820 may be responsive to audio signals from spatially separated microphone elements of the microphones 804 to produce directional audio signals that emphasize sounds originating from different areas of the environment of the voice-enabled device 108 or from different directions relative to the voice-enabled device 108. The beamforming components 820 may in some cases produce audio signal metric values that may be used in arbitration. For example, the beamforming components 820 may indicate a signal strength of voice activity level corresponding to each directional audio signal.

Executable components stored in the computer-readable media 810 and executed by the processors 800 may include a wake word detection component 822 that monitors one or more of the directional audio signals to detect user utterances of the system of the trigger expression. As described above, wakeword detection may be implemented using keyword spotting technology, as an example.

The software components may also include a voice activity detection component 824 configured to monitor levels of voice presence in the directional audio signals produced by the beamforming component 820. Levels of voice presence may be used as am audio signal metric value for purposes of arbitration. In some examples, the voice activity may include an indication of the signal strength of the speech utterance 106 and an indication of ambient noise in the environment 102. For instance, the voice activity may be a ratio of the signal strength of the speech utterance 106 in an audio data 114 with the ambient noise in the audio data 114.

Software components of the voice-enabled device 108 may also include a sound source localization (SSL) component 824 that may be used to determine the distance of the user 104 from the voice-enabled device 108. The SSL component 824 is configured to analyze differences in arrival times of received sound at the respective microphones of the microphones 804 in order to determine the position from which the received sound originated. For example, the SSL component 824 may use time-difference-of-arrival (TDOA) techniques to determine the position or direction of a sound source. The determined position may be used as an audio signal metric value for purpose of performing arbitration as described herein.

The voice-enabled device 108 also has various hardware components, not shown, such as communication components, power components, I/O components, signal processing components indicators, control buttons, amplifiers, etc. For instance, rather than receiving a "wake-word" to wake up, a voice-enabled device 108 instead begin listening in response to a user 104 pressing a button on the device 108.

The voice-enabled device 102 may have one or more network interfaces 828 such as a wireless or Wi-Fi network communications interface, an Ethernet communications interface, a cellular network communications interface, a Bluetooth communications interface, etc., for communications with the speech processing system 110 over various types of networks 118, including wide-area network, local-area networks, private networks, public networks etc. In the case of a wireless communications interfaces, such interfaces may include radio transceivers and associated control circuits and logic for implementing appropriate communication protocols.

In some examples, the audio signal metric component 826 may determine an audio signal metric value for each of a plurality of audio signals 114 (e.g., beamformed audio signals) provided by the beamformer component 820. In some embodiments, each audio signal metric value is determined based on the samples of one of a plurality of frames of a beamformed audio signal. For example, a signal-to-noise ratio may be determined for a plurality of frames for each of the plurality of beamformed audio signals.

The audio signal metric values f may be determined for each of the plurality of beamformed audio signals for each frame, resulting in an array of numbers in the form f(n)(k):
{f(1)(k), f(2)(k), . . . , f(N)(k)}

Here, "k" is the time index and "n" is the audio stream index (or look direction index) corresponding to the nth beamformed audio signal.

An audio signal metric value may include a signal-to-noise ratio (SNR), a level of voice presence in the audio data 114, a spectral centroid measure (e.g., a peak spectral centroid measure), a speech energy level (e.g., a 4 Hz modulation energy), a spectral flux, a particular percentile frequency (e.g., a $90^{th}$ percentile frequency), a periodicity, a clarity, a harmonicity, and so on. A spectral centroid measure generally provides a measure for a centroid mass of a spectrum. A spectral flux generally provides a measure for a rate of spectral change. A particular percentile frequency generally provides a measure based on a minimum frequency bin that covers at least a particular percentage (e.g., 90%) of the total power. A periodicity generally provides a measure that may be used for pitch detection in noisy environments. Clarity generally provides a measure that has a high value for voiced segments and a low value for background noise. Harmonicity is another measure that generally provides a high value for voiced segments and a low value for background noise. A speech energy level (e.g., 4 Hz modulation energy) generally provides a measure that has a high value for speech due to a speaking rate. In other embodiments, any another audio signal metric value may be determined that is some function of raw beamformed signal data over a brief time window (e.g., typically not more than one frame). In some instances, an audio signal metric value may be determined based on samples of a plurality of frames of a beamformed audio signal. Further, in some instances an audio signal metric value may be referred to as a signal feature.

In some instances, the audio signal metric component 828 may determine an audio signal metric value with respect to a particular beamformed audio signal. As one example, an SNR value may be determined for a beamformed audio signal that is associated with a particular look direction. In other instances, an audio signal metric value may be determined for multiple beamformed audio signals. As one example, an average audio signal metric value may be determined for a plurality of beamformed audio signals that are determined for a voice-enabled device, such as an average SNR value across any number of beamformed audio signals for the voice-enabled device.

While various processing techniques and audio signal metric values are discussed herein, any other type of audio signal metric value may be determined using the components of the voice-enabled device 108.

As used herein, a processor, such as processor(s) 120 and/or 800, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 120 and/or 800 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 120 and/or 800 may possess its own local memory, which also may store program components, program data, and/or one or more operating systems.

As described herein, computer-readable media 122 and/or 810 may include volatile and nonvolatile memory, removable and non-removable media implemented in any method or technology for storage of information, such as computer-readable instructions, data structures, program component, or other data. Such computer-readable media 122 and/or 810 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 120 and/or 800 to execute instructions stored on the computer-readable media 122 and/or 810. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media 122 and/or 810, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Each of the network interface(s) 148 and network interface(s) 828 may enable communications between the voice-enabled devices 108 and the remote system 110, as well as other networked devices. Such network interface(s) can include one or more network interface controllers (NICs) or other types of transceiver devices to send and receive communications over a network.

For instance, each of the net network interface(s) 148 and network interface(s) 828 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 148 and network interface(s) 828 may include a wide area network (WAN) component to enable communication over a wide area network. The network 118 may represent an array of wired networks, wireless networks, such as WiFi, or combinations thereof.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving, from a first device, first audio data representing first sound;
   receiving, from a second device, second audio data representing second sound captured by a second microphone of the second device;
   determining that the first audio data was received within a threshold period of time of when the second audio data was received;
   based at least in part on the first audio data being received within the threshold period of time of when the second audio data was received, generating an association between the first device and the second device indicating that the first device is located in a same physical environment as the second device; and
   storing the association indicating that the first device is in the same physical environment as the second device, wherein the association is to be used in future processing of audio data received from only the first device.

2. The method of claim 1, further comprising:
   identifying a first signal-to-noise (SNR) value associated with the first audio data;
   identifying a second SNR value associated with the second audio data;
   determining that the first SNR value is greater than or equal to a threshold SNR value;
   determining that the second SNR value is greater than or equal to the threshold SNR value; and
   wherein the generating the association between the first device and the second device is further based at least in part on the first SNR value and the second SNR value being greater than or equal to the threshold SNR value.

3. The method of claim 1, further comprising:
   identifying a first audio-signal metric associated with the first audio data;
   identifying a second audio-signal metric associated with the second audio data;
   determining that the first audio-signal metric is within a threshold amount to the second audio-signal metric; and
   wherein the generating the association between the first device and the second device is further based at least in part on the first audio-signal metric is within a threshold amount to the second audio-signal metric.

4. The method of claim 1, further comprising:
   determining a number of instances where audio data was received from the first device within the threshold period of time of when audio data was received from the second device;
   determining that the number of instances is greater than or equal to a threshold number of instances; and
   wherein the generating the association between the first device and the second device is further based at least in part on the number of instances being greater than or equal to the threshold number of instances.

5. The method of claim 1, further comprising:
   determining a number of instances where audio data was received from the first device within the threshold period of time of when audio data was received from the second device;
   identifying first signal-to-noise (SNR) values associated with the first device, wherein an SNR value of the first SNR values is associated with corresponding audio data received from the first device in the number of instances;
   identifying second SNR values associated with the second device, wherein an SNR value of the second SNR values is associated with corresponding audio data received from the second device in the number of instances;
   determining that, for more than a threshold number of the number of the instances, the first SNR values and the second SNR values are greater than or equal to a threshold SNR value; and
   wherein the generating the association between the first device and the second device is further based at least in part on the determining that, for more than the threshold number of the number of the instances, the first SNR values and the second SNR values are greater than or equal to the threshold SNR value.

6. The method of claim 1, further comprising, prior to the generating the association:
   storing, in memory of a network-based computing device, an initial association between the first device, the second device, and a third device;
   determining that third audio data was not received from the third device within the threshold period of time from when at least one of the first audio data or the second audio data was received; and
   based at least in part on the third audio data not being received from the third device within the threshold period of time from when at least one of the first audio data or the second audio data was received, removing the initial association from the memory of the network-based computing device.

7. The method of claim 1, further comprising:
storing, in memory of one or more network-based computing devices, the association between the first device and the second device;
determining metadata for the association between the first device and the second device, the metadata indicating at least one of:
a device name assigned to the first device;
an action previously performed by the first device; or
an identity of a user that issued a voice command represented by the first audio data; and
storing the metadata in the memory of the one or more network-based computing devices.

8. A system comprising:
one or more processors; and
computer-readable media storing computer-executable instructions that, when executed by the one or more processors, cause the one or more processors to perform operations comprising:
receiving, from a first device, first audio data representing first sound captured by a first microphone of the first device;
receiving, from a second device, second audio data representing second sound captured by a second microphone of the second device;
determining that the first audio data was received within a threshold period of time of when the second audio data was received;
based at least in part on the first audio data being received within the threshold period of time of when the second audio data was received, generating an association between the first device and the second device;
receiving, from the first device, third audio data representing a speech utterance captured by the first microphone of the first device;
determining intent data representing the speech utterance;
determining, based at least in part on the association and the intent data, a command to cause the second device to perform an action; and
sending, to the second device, command data indicating the command.

9. The system of claim 8, the operations further comprising:
determining a first signal-to-noise (SNR) value associated with the first audio data;
determining a second SNR value associated with the second audio data;
determining that the first SNR value is greater than or equal to a threshold SNR value; and
determining that the second SNR value is greater than or equal to the threshold SNR value,
wherein generating the association between the first device is further based at least in part on the first SNR value and second SNR value being greater than or equal to the threshold SNR value.

10. The system of claim 8, the operations further comprising:
identifying a first audio-signal metric associated with the first audio data;
identifying a second audio-signal metric associated with the second audio data; and
determining that the first audio-signal metric is within a threshold amount to the second audio-signal metric,
wherein the generating the association between the first device and the second device is further based at least in part on the first audio-signal metric is within a threshold amount to the second audio-signal metric.

11. The system of claim 8, the operations further comprising:
determining a number of instances where audio data was received from the first device within the threshold period of time of when audio data was received from the second device; and
determining that the number of instances is greater than or equal to a threshold number of instances,
wherein the generating the association between the first device and the second device is further based at least in part on the number of instances being greater than or equal to the threshold number of instances.

12. A system comprising:
one or more processors; and
computer-readable media storing computer-executable instructions that, when executed by the one or more processors, cause the one or more processors to perform operations comprising:
receiving, from a first device, first audio data representing first sound captured by a first microphone of the first device;
receiving, from a second device, second audio data representing second sound captured by a second microphone of the second device;
determining that the first audio data was received within a threshold period of time of when the second audio data was received; and
based at least in part on the first audio data being received within the threshold period of time of when the second audio data was received, storing an association indicating that the first device is in a same physical environment as the second device to be used in future processing of audio data received from only the first device.

13. The system of claim 12, the operations further comprising:
receiving, from only the first device, third audio data representing third sound;
determining, using natural language processing and the third audio data, that the third sound includes a speech utterance comprising a request to perform an action;
determining, based at least in part on the association between the first device and the second device, that the second device is to perform the action; and
sending data to the second device to cause the second device to perform the action.

14. The system of claim 12, wherein the association comprises a first association, the operations further comprising:
storing, in memory of one or more network-based computing devices, timestamp data indicating:
a first time at which first audio data was received from the first device;
a second time at which second audio data was received from the second device;
a third time at which third audio data was received from a third device; and
a fourth time at which fourth audio data was received from a fourth device;
determining, based at least in part on the timestamp data, that the third time at which the third audio data was received from the third device is within the threshold period of time of the fourth time at which the fourth audio data was received from the fourth device; and storing, in the memory of one or more network-based computing devices, a second association between the third device and the fourth device.

15. The system of claim 14, the operations further comprising:
identifying a first signal-to-noise (SNR) value associated with the first audio data;
identifying a second SNR value associated with the second audio data;
identifying a third SNR value associated with the third audio data;
identifying a fourth SNR value associated with the fourth audio data;
determining that the first SNR value is greater than or equal to a threshold SNR value;
determining that the second SNR value is greater than or equal to the threshold SNR value;
determining that the third SNR value is greater than or equal to the threshold SNR value;
determining that the fourth SNR value is greater than or equal to the threshold SNR value;
generating the first association based at least in part on the first SNR value and the second SNR value being greater than or equal to the threshold SNR value; and
generating the second association based at least in part on the third SNR value and the fourth SNR value being greater than or equal to the threshold SNR value.

16. The system of claim 14, the operations further comprising:
identifying a first set of instances where first audio data was received from the first device within the threshold period of time of second audio data being received from the second device;
identifying a second set of instances where third audio data was received from the third device within the threshold period of time of fourth audio data being received from the fourth device;
determining that, for more than a threshold number of the first set of instances, first sound-to-noise (SRN) values for the first audio data and corresponding second SNR values for the second audio data are greater than or equal to a threshold SNR value;
determining that, for more than the threshold number of the second set of instances, third sound-to-noise (SRN) values for the third audio data and corresponding fourth SNR values for the fourth audio data are greater than or equal to the threshold SNR value;
generating the first association between the first device and the second device; and
generating the second association between the third device and the fourth device.

17. The system of claim 14, wherein the timestamp data further indicates:
first times at which first audio data was received from the first device;
second times at which second audio data was received from the second device;
third times at which third audio data was received from the third device; and
fourth times at which fourth audio data was received from the fourth device; and
the operations further comprising:
identifying, based at least in part on the timestamp data, a set of instances where audio data was received from at least two of the first device, the second device, the third device, or the fourth device; and
analyzing the set of instances using gap statistic estimation to determine a number of associations between the first device, the second device, the third device, and the fourth device, wherein the number of associations includes the first association and the second association.

18. The system of claim 17, the operations further comprising:
analyzing the set of instances using a k-means clustering algorithm, wherein the number of associations determined using the gap statistic estimation is utilized as a number of clusters into which the k-means clustering algorithm is to partition the set of instances;
generating, based at least in part on the analyzing the set of instances using the k-means clustering algorithm, the first association between the first device and the second device; and
generating, based at least in part on the analyzing the set of instances using the k-means clustering algorithm, the second association between the third device and the fourth device.

19. The system of claim 12, the operations further comprising:
determining a number of instances where audio data was received from the first device within the threshold period of time of when audio data was received from the second device;
determining that the number of instances is greater than or equal to a threshold number of instances; and
generating the association between the first device and the second device based at least in part on the number of instances being greater than or equal to the threshold number of instances.

20. The system of claim 12, the operations further comprising, subsequent to storing the first association:
receiving, from the first device, third audio data;
determining that fourth audio data was not received from the second device within the threshold period of time of when the third audio data was received; and
removing the association between the first device and the second device from memory of one or more network-based computing devices.

* * * * *